United States Patent
Ma et al.

(10) Patent No.: US 11,203,446 B2
(45) Date of Patent: Dec. 21, 2021

(54) METHOD FOR FAULT DIAGNOSIS OF AERO-ENGINE SENSOR AND ACTUATOR BASED ON LFT

(71) Applicant: DALIAN UNIVERSITY OF TECHNOLOGY, Dalian (CN)

(72) Inventors: Yanhua Ma, Dalian (CN); Xian Du, Dalian (CN); Rui Wang, Dalian (CN); Min Liu, Dalian (CN); Ximing Sun, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 309 days.

(21) Appl. No.: 16/604,042

(22) PCT Filed: Dec. 11, 2018

(86) PCT No.: PCT/CN2018/120243
§ 371 (c)(1),
(2) Date: Oct. 9, 2019

(87) PCT Pub. No.: WO2020/118512
PCT Pub. Date: Jun. 18, 2020

(65) Prior Publication Data
US 2020/0339285 A1 Oct. 29, 2020

(51) Int. Cl.
*B64F 5/60* (2017.01)

(52) U.S. Cl.
CPC ..................... *B64F 5/60* (2017.01)

(58) Field of Classification Search
CPC ..... B64F 5/60; G07C 5/0808; G05B 23/0243; G05B 2219/45071
See application file for complete search history.

(56) References Cited

U.S. PATENT DOCUMENTS

| 9,073,623 B1* | 7/2015 | Suh ....................... G01M 11/083 |
| 2005/0193739 A1* | 9/2005 | Brunell ................ G05B 13/042 60/772 |

(Continued)

FOREIGN PATENT DOCUMENTS

| CN | 103983453 A | 8/2014 |
| CN | 104950876 A | 9/2015 |

(Continued)

OTHER PUBLICATIONS

International Search Report and Written Opinion dated Aug. 28, 2019 issued in corresponding Application No. PCT/CN2018/120243.

*Primary Examiner* — Regis J Betsch
*Assistant Examiner* — Jeremy A Delozier
(74) *Attorney, Agent, or Firm* — Muncy, Geissler, Olds & Lowe, P.C.

(57) ABSTRACT

The present invention discloses a method for fault diagnosis of the sensors and actuators of an aero-engine based on LFT, and belongs to the field of fault diagnosis of aero-engines. The method comprises: establishing an aero-engine state space model using a combination of a small perturbation method and a linear fitting method; establishing an affine parameter-dependent linear-parameter-varying (LPV) model of the aero-engine based on the model; converting the LPV model of the aero-engine having perturbation signals and sensor and actuator fault signals into a linear fractional transformation (LFT) structure to obtain an synthesis framework of an LPV fault estimator; solving a set of linear matrix inequalities (LMIs) to obtain the solution conditions of the fault estimator; and designing the fault estimator in combination with the LFT structure to realize fault diagnosis of the sensors and actuators of an aero-engine.

1 Claim, 7 Drawing Sheets

(56) References Cited

U.S. PATENT DOCUMENTS

2011/0052370 A1* 3/2011 Karpman ............. G05D 7/0635
　　　　　　　　　　　　　　　　　　　　　　415/13
2011/0054863 A1* 3/2011 Larimore ................ G06F 9/48
　　　　　　　　　　　　　　　　　　　　　　703/2

FOREIGN PATENT DOCUMENTS

| CN | 106873568 A | 6/2017 |
| CN | 107703742 A | 2/2018 |
| CN | 107797543 A | 3/2018 |

* cited by examiner

METHOD FOR FAULT DIAGNOSIS OF AERO-ENGINE SENSOR AND ACTUATOR BASED ON LFT

TECHNICAL FIELD

The present invention belongs to the field of fault diagnosis of aero-engines, and particularly relates to a method for fault diagnosis of an aero-engine sensor and actuator based on LFT.

BACKGROUND

An aero-engine is an important component of an aircraft, and the health of flight states directly depends on the health of the aero-engine. As an underlying information collection platform of the aero-engine, an aero-engine sensor can accurately measure the state information of the component and the system in the operation process of the aero-engine, so as to construct an effective control system. If the aero-engine sensor fails, accurate performance and state parameters cannot be provided for the control system, and accurate control cannot be achieved. An aero-engine actuator is an important link for connecting the aero-engine and the control system. The actuator makes the controlled object change according to a control command given by the control system, so as to control the operation state of the aero-engine. If the aero-engine actuator fails, wrong information will be provided for the control system, which will bring hidden danger to the safety of the aircraft and may cause catastrophic consequences. Therefore, the present invention monitors the performance of the sensors and the actuators of the aero-engine, and has an important significance for real-time diagnosis and alarm of a fault state. Literatures have shown that, firstly, the existing technology of fault diagnosis of the aero-engine sensor and actuator mainly focuses on fault detection, that is, the existing technology can only decide whether the aero-engine sensor and the actuator fail, and few researches are made on the estimation method of the fault signal. Specifically, different fault modes of the sensor and the actuator correspond to different fault treatment measures. For the fault of the aero-engine sensor, the actual fault is mainly drift. If the sensor drifts, the sensor measurement information can be corrected through controller design. The faults of the aero-engine actuator include degradation, drift, jamming, etc. If the actuator degrades or drifts, the aero-engine can be normally operated through the controller design; and if the actuator jams, the actuator needs to be switched to a redundancy mode, and the actuator is maintained after the flight is completed. Therefore, only the fault detection is researched, that is, whether the fault occurs, which is not conducive to the safe operation and maintenance of the aero-engine. Reliable estimation of the severity of fault can realize accurate judgment of the states of the aero-engine sensor and actuator and simultaneously reduce the maintenance cost of the aero-engine. In addition, the aero-engine can be described as a typical linear-parameter-varying (LPV) system. The literature shows that the fault estimation methods of the LPV system are mainly classified into two categories in recent years: the first category of methods is an observer-based method, but such methods are not robust to perturbation and model uncertainty in the system, that is, the errors caused by external perturbation and modeling of the system will seriously affect the observation result of an observer. The other category is a fault estimation method based on $H_\infty$ optimization technology. The method can improve the robustness of the system, but the fault estimation research based on this technology is still in the beginning stage, and still needs to further discuss many issues.

SUMMARY

In view of the problem that a fault signal cannot be accurately estimated under external disturbance and modeling errors in the existing technology of fault diagnosis of an aero-engine sensor and actuator, the present invention provides a method for fault diagnosis of the sensor and actuator of an aero-engine based on LFT, which can adaptively adjust the parameters of a fault estimator according to the change of the parameters in an LPV model of the aero-engine, realize rapid detection of faults in the system, accurately reconstruct the fault signal, propose maintenance recommendations in time and provide better basic guarantee for later fault-tolerant control.

To achieve the above purpose, the technical solution adopted by the present invention comprises the following steps:

A method for fault diagnosis of the sensor and actuator of an aero-engine based on LFT comprises the following steps:

step 1: establishing an aero-engine state space model using a combination of a small perturbation method and a linear fitting method;

step 2: establishing an affine parameter-dependent linear-parameter-varying (LPV) model of the aero-engine;

step 3: converting the affine parameter-dependent LPV model of the aero-engine having perturbation and sensor and actuator fault into a linear fractional transformation (LFT) structure, and establishing an $H_{2\delta}$ synthesis framework of an LPV fault estimator of the aero-engine;

step 4: solving a set of linear matrix inequalities (LMIs) to obtain the solution conditions of the fault estimator;

step 5: designing the fault estimator in combination with the LFT structure to realize fault diagnosis of the sensor and actuator of the aero-engine.

The step 1 comprises the following steps:

step 1.1: inputting fuel pressure $p_f$ under steady operating points into an aero-engine; inputting a fuel pressure step signal $U_{pfi}$, with an amplitude of 0.01 $p_f$ into the aero-engine after relative conversion speed $n_h$ of a high pressure rotor of the aero-engine reaches a corresponding steady state; and respectively collecting relative conversion speed response $Y_{nh1}$ of the high pressure rotor and relative conversion speed response $Y_{nl1}$ of a low pressure rotor outputted by the aero-engine;

step 1.2: repeating the process of the step 1 for N times; and respectively collecting the relative conversion speed response $Y_{nhi}$ of the high pressure rotor and the relative conversion speed response $Y_{nli}$ of the low pressure rotor under given fuel pressure $p_{fi}$, wherein i=1,2,3, ..., N;

step 1.3: constructing a discrete small perturbation state space model of the aero-engine under the steady operating points according to the linear fitting method by taking the fuel pressure step signal $U_{pfi}$ as an input variable and taking the relative conversion speed response) $Y_{nhi}$ of the high pressure rotor and the relative conversion speed response $Y_{nli}$ of the low pressure rotor as state variables;

step 1.4: converting the discrete small perturbation state space model of the aero-engine under the steady operating points into a continuous small perturbation state space model according to a sampling period T to obtain the state space model of the aero-engine;

$$\begin{cases} \dot{x}_p = A_{pi}x_p + B_{pi}u \\ y_p = C_{pi}x_p + D_{pi}u \end{cases} \quad (1)$$

wherein the state variable is $x_p = [Y_{nl}^T \ Y_{nh}^T]^T \in R^n$; $\dot{x}_p$ represents a first derivative of $x_p$; an input variable is $u = U_{pf} \in R^t$; an output variable is $y_p = Y_{nh} \in R^m$; $A_{pi}$, $B_{pi}$, $C_{pi}$ and $D_{pi}$ are system state space matrices; $C_{pi} = C_p = [0 \ 1]$; $D_{pi} = D_p = 0$; $R^n$, $R^t$ and $R^m$ respectively represent sets of real numbers with dimensions of n, t and m; T represents transposing for the matrices.

The step 2 comprises the following steps:

step 2.1: setting the relative conversion speed $n_{hi}$ of the high pressure rotor of the aero-engine as a scheduling parameter $\theta(i)$, $i=1,2,3,\ldots,N$;

step 2.2: expressing a system matrix $A_p(\theta)$ and a control matrix $B_p(\theta)$ of the continuous small perturbation state space model of the aero-engine as affine parameter-dependent forms, as follows:

$$A_p(\theta) = A_0 + \theta A_1, \ B_p(\theta) = B_0 + \theta B_1 \quad (2)$$

wherein $A_0$, $A_1$, $B_0$ and $B_1$ respectively represent coefficient matrices to be solved; rewriting the formula (2) into $$A_p(\theta) = [I \ \theta I]\begin{bmatrix} A_0 \\ A_1 \end{bmatrix}, \ B_p(\theta) = [I \ \theta I]\begin{bmatrix} B_0 \\ B_1 \end{bmatrix} \quad (3)$$

wherein I is a unit matrix;
then $$\begin{bmatrix} A_0 \\ A_1 \end{bmatrix} = [I \ \theta I]^+ A_p(\theta), \ \begin{bmatrix} B_0 \\ B_1 \end{bmatrix} = [I \ \theta I]^+ B_p(\theta) \quad (4)$$

wherein $[I \ \theta I]^+$ is Moore-Penrose pseudo-inverse of $[I \ \theta I]$, i.e., the system matrix $A_p(\theta)$ and the control matrix $B_p(\theta)$ of the solved affine parameter-dependent LPV model of the aero-engine;

step 2.3: establishing the affine parameter-dependent LPV model of the aero-engine $$\dot{x}_p = A_p(\theta)x_p + B_p(\theta)u$$

$$y_p = C_p x_p + D_p u \quad (5).$$

The step 3 of establishing an $H_\infty$ synthesis framework of an LPV fault estimator of the aero-engine comprises the following steps:

step 3.1: expressing the affine parameter-dependent LPV model $P(s, \theta)$ of the aero-engine with perturbation and sensor and actuator fault into $$\dot{x}_p = A_p(\theta)x_p + B_p(\theta)u + E_p d + F_p f$$

$$y_p = C_p x_p + D_p u + G_p d + H_p f \quad (6)$$

wherein $d \in R^q$ is a perturbation signal; $f \in R^l$ is a fault signal comprising sensor fault and actuator fault; $R^q$ and $R^l$ respectively represent sets of real numbers with dimensions of q and l; $E_p$, $F_p$, $G_p$ and $H_p$ are system state space matrices; an upper LFT structure of $P(s, \theta)$ is expressed into $$\begin{cases} \begin{bmatrix} \dot{x}_p \\ z_\theta \\ y_p \end{bmatrix} = \begin{bmatrix} A_p & B_{p\theta} & B_{pw} \\ C_{p\theta} & D_{p\theta\theta} & D_{p\theta w} \\ C_{pw} & D_{pw\theta} & D_{pww} \end{bmatrix}\begin{bmatrix} x_p \\ w_\theta \\ w \end{bmatrix}, w = \begin{bmatrix} u \\ d \\ f \end{bmatrix} \\ w_\theta = \Delta(\theta)z_\theta \end{cases} \quad (7)$$

wherein an external input variable is $w = [u^T \ d^T \ f^T]^T \in R^{p1}$; $w_\theta \in R^r$ is an output variable of a time varying part $\Delta(\theta) = \theta I$; $z_\theta \in R^r$ is an input variable of the time varying part $\Delta(\theta) = \theta I$; $A_p$, $B_{p\theta}$, $B_{pw}$, $C_{p\theta}$, $C_{pw}$, $D_{p\theta\theta}$, $D_{p\theta w}$, $D_{pw\theta}$ and $D_{pww}$ are system state space matrices; $R^{p1}$ and $R^r$ respectively represent sets of real numbers with dimensions of p1 and r; p1=t+q+l, i.e., the dimension p1 of the external input variable w is equal to the sum of the dimension t of the input variable u of the aero-engine, the dimension q of the perturbation signal d and the dimension l of the fault signal f;

step 3.2: setting the form of the fault estimator $K(s,\theta)$ as follows $$\begin{cases} \dot{x}_K = A_K(\theta)x_K + B_K(\theta)u_K \\ \hat{f} = C_K(\theta)x_K + D_K(\theta)u_K \end{cases} \quad (8)$$

wherein $x_K \in R^k$ is a state variable of the fault estimator $K(s,\theta)$; $\dot{x}_K$ represents a first derivative of $x_K$; $R^k$ represents a set of real numbers with a dimension of k; $u_K = [u^T \ y_p^T]^T \in R^{p2}$ is an input variable of $K(s,\theta)$; p2=t+m, i.e., the dimension p2 of the input variable $u_K$ of $K(s,\theta)$ is equal to the sum of the dimension t of the input variable u of the aero-engine and the dimension m of the output variable $y_p$ of the aero-engine; $\hat{f} \in R^l$ is an output variable of $K(s,\theta)$, i.e., an estimated value of the fault signal f; $A_K(\theta)$, $B_K(\theta)$, $C_K(\theta)$ and $D_K(\theta)$ are system state space matrices; $K(s,\theta)$ is express into a lower LFT structure as follows:

$$\begin{cases} \begin{bmatrix} \dot{x}_K \\ \hat{f} \\ z_K \end{bmatrix} = \begin{bmatrix} A_K & B_{K1} & B_{K\theta} \\ C_{K1} & D_{K11} & D_{K1\theta} \\ C_{K\theta} & D_{K\theta 1} & D_{K\theta\theta} \end{bmatrix}\begin{bmatrix} x_K \\ u_K \\ w_K \end{bmatrix}, u_K = \begin{bmatrix} u \\ y_p \end{bmatrix} \\ w_k = \Delta_k(\theta)z_k \end{cases} \quad (9)$$

wherein $w_K \in R^r$ is an output variable of the time varying part $\Delta_K(\theta) = \theta I$; $z_K \in R^r$ is an input variable of the time varying part $\Delta_k(\theta) = \theta I$; $A_K$, $B_{K1}$, $B_{K\theta}$, $C_{K\theta}$, $C_{K1}$, $C_{K\theta}$, $D_{K11}$, $D_{K1\theta}$, $D_{K\theta 1}$ and $D_{K\theta\theta}$ are system state space matrices;

step 3.3: according to the time varying part $\Delta(\theta)$ in the LPV model $P(s,\theta)$ of the aero-engine and the time varying part $\Delta_K(\theta)$ in the fault estimator $K(s,\theta)$, expressing the $H_\infty$ synthesis framework of the LPV fault estimator as:

$$\begin{bmatrix} \dot{x}_p \\ \dot{x}_K \\ z_K \\ z_\theta \\ e_f \end{bmatrix} = \begin{bmatrix} \bar{A} & \bar{B}_\theta & \bar{B}_w \\ \bar{C}_\theta & \bar{D}_{\theta\theta} & \bar{D}_{\theta w} \\ \bar{C}_w & \bar{D}_{w\theta} & \bar{D}_{ww} \end{bmatrix}\begin{bmatrix} x_p \\ x_K \\ w_K \\ w_\theta \\ w \end{bmatrix} \quad (10)$$

wherein $e_f = \hat{f} - f$ is a fault estimation error; system matrix $\bar{A} = A_0 + T_1 \Omega T_2$; system matrix $\bar{B}_\theta = B_{01} + T_1 \Omega T_3$; system matrix $\bar{B}_w = B_{02} + T_1 \Omega T_4$; system matrix $\bar{C}_\theta = C_{01} + T_5 \Omega T_2$; system matrix $\bar{D}_{\theta\theta} = D_{01} + T_5 \Omega T_3$; system matrix $\bar{D}_{\theta w} = D_{02} + T_5 \Omega T_4$; system matrix $\bar{C}_w = C_{02} + T_6 \Omega T_2$; system matrix $\bar{D}_{w\theta} = D_{03} + T_6 \Omega T_3$; system matrix $\bar{D}_{ww} = D_{04} + T_6 \Omega T_4$; fault estimator matrix $$\Omega = \begin{bmatrix} A_K & B_{K1} & B_{K\theta} \\ C_{K1} & D_{K11} & D_{K1\theta} \\ C_{K\theta} & D_{K\theta1} & D_{K\theta\theta} \end{bmatrix};$$

matrix $$T_1 = \begin{bmatrix} 0 & B_2 & 0_{n\times r} \\ I_k & 0 & 0 \end{bmatrix};$$

matrix $$T_2 = \begin{bmatrix} 0 & I_k \\ C_2 & 0 \\ 0_{r\times n} & 0 \end{bmatrix};$$

matrix $$T_3 = \begin{bmatrix} 0_{k\times r} & 0 \\ 0 & D_{2\theta} \\ I_r & 0 \end{bmatrix};$$

matrix $$T_4 = \begin{bmatrix} 0_{k\times p1} \\ D_{21} \\ 0_{r\times p1} \end{bmatrix};$$

matrix $$T_5 = \begin{bmatrix} 0_{r\times k} & 0 & I_r \\ 0 & D_{\theta 2} & 0 \end{bmatrix};$$

matrix $T_6 = [0_{p1\times k} \; D_{12} \; 0_{p1\times r}]$; matrix $$A_0 = \begin{bmatrix} A & 0 \\ 0 & 0_k \end{bmatrix};$$

matrix $$B_{01} = \begin{bmatrix} 0 & B_\theta \\ 0_{k\times r} & 0 \end{bmatrix};$$

matrix $$B_{02} = \begin{bmatrix} B_1 \\ 0_{k\times p1} \end{bmatrix};$$

matrix $$C_{01} = \begin{bmatrix} 0 & 0_{r\times k} \\ C_\theta & 0 \end{bmatrix};$$

matrix $$D_{01} = \begin{bmatrix} 0_r & 0 \\ 0 & D_{\theta\theta} \end{bmatrix};$$

matrix $$D_{02} = \begin{bmatrix} 0_{r\times p1} \\ D_{\theta 1} \end{bmatrix};$$

matrix $C_{02} = [C_1 \; 0_{p1\times k}]$; matrix $D_{03} = [0_{p1\times r} \; D_{1\theta}]$; matrix $D_{04} = D_{11}$; matrix $A = A_p$; matrix $B_\theta = B_{p\theta}$; matrix $B_1 = B_{pw}$; matrix $B_2 = 0_{n\times l}$; matrix $C_\theta = C_{p\theta}$; matrix $D_{\theta\theta} = D_{p\theta\theta}$; matrix $D_{\theta 1} = D_{p\theta w}$; matrix $D_{\theta 2} = 0_{r\times l}$; matrix $C_1 = 0_{p1\times n}$; matrix $D_{1\theta} = 0_{p1\times r}$; matrix $$D_{11} = \begin{bmatrix} 0_{l\times(p1-l)} & -I_l \\ 0_{(p1-l)\times(p1-l)} & 0_{(p1-l)\times l} \end{bmatrix};$$

matrix $$D_{12} = \begin{bmatrix} I_l \\ 0_{(p1-l)\times l} \end{bmatrix};$$

matrix $$C_2 = \begin{bmatrix} 0_{r\times n} \\ C_{pw} \end{bmatrix};$$

matrix $$D_{2\theta} = \begin{bmatrix} 0_{r\times r} \\ D_{pw\theta} \end{bmatrix};$$

matrix $$D_{21} = \begin{bmatrix} I_t & 0_{t\times q} & 0_{t\times l} \\ & D_{pww} & \end{bmatrix};$$

matrix $D_{22} = 0_{p2\times l}$; n represents the dimension of the state variable $x_p$ of the aero-engine; r represents the dimension of the output variable $w_\theta$ of the time varying part $\Delta(\theta)$ and the output variable $w_K$ of the time varying part $\Delta_K(\theta)$; k represents the dimension of the state variable $x_K$ of the fault estimator $K(s,\theta)$.

The step 4 of obtaining the solution conditions of the fault estimator comprises the following steps:

step 4.1: obtaining the solution conditions of the fault estimator $K(s,\theta)$, i.e., $$\begin{bmatrix} I & 0 & 0 \\ 0 & I & 0 \\ 0 & 0 & I \\ \overline{A} & \overline{B}_\theta & \overline{B}_w \\ \overline{C}_\theta & \overline{D}_{\theta\theta} & \overline{D}_{\theta w} \\ \overline{C}_w & \overline{D}_{w\theta} & \overline{D}_{ww} \end{bmatrix}^T \begin{bmatrix} 0 & 0 & 0 & X & 0 & 0 \\ 0 & Q & 0 & 0 & S & 0 \\ 0 & 0 & -\gamma I & 0 & 0 & 0 \\ X & 0 & 0 & 0 & 0 & 0 \\ 0 & S^T & 0 & 0 & R & 0 \\ 0 & 0 & 0 & 0 & 0 & \frac{1}{\gamma}I \end{bmatrix} \begin{bmatrix} I & 0 & 0 \\ 0 & I & 0 \\ 0 & 0 & I \\ \overline{A} & \overline{B}_\theta & \overline{B}_w \\ \overline{C}_\theta & \overline{D}_{\theta\theta} & \overline{D}_{\theta w} \\ \overline{C}_w & \overline{D}_{w\theta} & \overline{D}_{ww} \end{bmatrix} < 0 \quad (11)$$

$$\begin{bmatrix} \Delta(\theta) & 0 \\ 0 & \Delta_K(\theta) \\ I & 0 \\ 0 & I \end{bmatrix}^T P \begin{bmatrix} \Delta(\theta) & 0 \\ 0 & \Delta_K(\theta) \\ I & 0 \\ 0 & I \end{bmatrix} > 0 \quad (12)$$

wherein X is a symmetric positive-definite matrix; a full block scaling matrix $$P = \begin{bmatrix} Q & S \\ S^T & R \end{bmatrix}$$

is a symmetric matrix; $\gamma > 0$ is a performance index; Q, S and R respectively represent subscalar block matrices of P;

step 4.2: partitioning the symmetric positive-definite matrix X and an inverse matrix $X^{-1}$ thereof;

$$X = \begin{bmatrix} L & M \\ M^T & E \end{bmatrix}, X^{-1} = \begin{bmatrix} J & N \\ N^T & F \end{bmatrix} \quad (13)$$

wherein L, M and E respectively represent block matrices of X; J, N and F respectively represent sub-block matrices of $X^{-1}$;

partitioning the full block scaling matrix P and the inverse matrix $\tilde{P}$ thereof $$P = \begin{bmatrix} Q & S \\ S^T & R \end{bmatrix} = \begin{bmatrix} Q_1 & Q_2 & S_1 & S_2 \\ Q_2^T & Q_3 & S_3 & S_4 \\ \hline S_1^T & S_3^T & R_1 & R_2 \\ S_2^T & S_4^T & R_2^T & R_3 \end{bmatrix}, \quad (14)$$

$$\tilde{P} = \begin{bmatrix} \tilde{Q} & \tilde{S} \\ \tilde{S}^T & \tilde{R} \end{bmatrix} = \begin{bmatrix} \tilde{Q}_1 & \tilde{Q}_2 & \tilde{S}_1 & \tilde{S}_2 \\ \tilde{Q}_2^T & \tilde{Q}_3 & \tilde{S}_3 & \tilde{S}_4 \\ \hline \tilde{S}_1^T & \tilde{S}_3^T & \tilde{R}_1 & \tilde{R}_2 \\ \tilde{S}_2^T & \tilde{S}_4^T & \tilde{R}_2^T & \tilde{R}_3 \end{bmatrix}$$

wherein $Q_1$, $Q_2$ and $Q_3$ respectively represent sub-block matrices of Q; $S_1$, $S_2$, $S_3$ and $S_4$ respectively represent sub-block matrices of S; $R_1$, $R_2$ and $R_3$ respectively represent sub-block matrices of R; $\tilde{Q}$, $\tilde{S}$ and $\tilde{R}$ respectively represent sub-block matrices of $\tilde{P}$; $\tilde{Q}_1$, $\tilde{Q}_2$ and $\tilde{Q}_3$ respectively represent sub-block matrices of $\tilde{Q}$; $\tilde{S}_1$, $\tilde{S}_2$, $\tilde{S}_3$ and $\tilde{S}_4$ respectively represent sub-block matrices of $\tilde{S}$; $\tilde{R}_1$, $\tilde{R}_2$ and $\tilde{R}_3$ respectively represent sub-block matrices of $\tilde{R}$;

simplifying the solution conditions of the fault estimator $K(s,\theta)$, i.e., $$N_L^T \begin{bmatrix} I & 0 & 0 \\ 0 & I & 0 \\ 0 & 0 & I \\ A & B_\theta & B_1 \\ C_\theta & D_{\theta\theta} & D_{\theta 1} \\ C_1 & D_{1\theta} & D_{11} \end{bmatrix}^T \begin{bmatrix} 0 & 0 & 0 & L & 0 & 0 \\ 0 & Q_3 & 0 & 0 & S_4 & 0 \\ 0 & 0 & -\gamma I & 0 & 0 & 0 \\ L & 0 & 0 & 0 & 0 & 0 \\ 0 & S_4^T & 0 & 0 & R_3 & 0 \\ 0 & 0 & 0 & 0 & 0 & \frac{1}{\gamma}I \end{bmatrix} \begin{bmatrix} I & 0 & 0 \\ 0 & I & 0 \\ 0 & 0 & I \\ A & B_\theta & B_1 \\ C_\theta & D_{\theta\theta} & D_{\theta 1} \\ C_1 & D_{1\theta} & D_{11} \end{bmatrix} N_L < 0 \quad (15)$$

$$N_J^T \begin{bmatrix} -A^T & -C_\theta^T & -C_1^T \\ -B_\theta^T & -D_{\theta\theta}^T & -D_{1\theta}^T \\ -B_1^T & -D_{\theta 1}^T & -D_{11}^T \\ I & 0 & 0 \\ 0 & I & 0 \\ 0 & 0 & I \end{bmatrix}^T \begin{bmatrix} 0 & 0 & 0 & J & 0 & 0 \\ 0 & \tilde{Q}_3 & 0 & 0 & \tilde{S}_4 & 0 \\ 0 & 0 & -\frac{1}{\gamma}I & 0 & 0 & 0 \\ J & 0 & 0 & 0 & 0 & 0 \\ 0 & \tilde{S}_4^T & 0 & 0 & \tilde{R}_3 & 0 \\ 0 & 0 & 0 & 0 & 0 & \gamma I \end{bmatrix} \begin{bmatrix} -A^T & -C_\theta^T & -C_1^T \\ -B_\theta^T & -D_{\theta\theta}^T & -D_{1\theta}^T \\ -B_1^T & -D_{\theta 1}^T & -D_{11}^T \\ I & 0 & 0 \\ 0 & I & 0 \\ 0 & 0 & I \end{bmatrix} N_J > 0 \quad (16)$$

$$\begin{bmatrix} L & I \\ I & J \end{bmatrix} > 0 \quad (17)$$

$$R > 0, Q = -R, S + S^T = 0 \quad (18)$$

wherein $N_L$ and $N_J$ respectively represent the bases of the nuclear spaces of $[C_2 \ D_{2\theta} \ D_{21}]$ and $[B_2^T \ D_{\theta 2}^T \ D_{12}^T]$;

step 4.3: solving the LMIs (15)-(18) to obtain matrix solutions L, J, $Q_3$, $\tilde{R}_3$, $S_4$ and $\tilde{S}_4$;

the step 5 of designing the fault estimator in combination with the LFT structure comprises the following steps:

step 5.1: solving the symmetric positive-definite matrix X, the full block scaling matrix P and the inverse matrix $\tilde{P}$ thereof from the formulas (13) and (14) according to the solved matrix solutions L, J, $Q_3$, $\tilde{R}_3$, $S_4$ and $\tilde{S}_4$;

step 5.2: according to Schur complement Lemma, expressing the LMI (11) as $$\begin{bmatrix} \overline{A}^T X + X\overline{A} & X\overline{B}_\theta + \overline{C}_\theta^T S^T & X\overline{B}_w & \overline{C}_\theta^T & \overline{C}_w^T \\ \overline{B}_\theta^T X + S\overline{C}_\theta & Q + \overline{D}_{\theta\theta}^T S^T + S\overline{D}_{\theta\theta} & S\overline{D}_{\theta w} & \overline{D}_{\theta\theta}^T & \overline{D}_{w\theta}^T \\ \overline{B}_w^T X & \overline{D}_{\theta w}^T S^T & -\gamma I & \overline{D}_{\theta w}^T & \overline{D}_{ww}^T \\ \overline{C}_\theta & \overline{D}_{\theta\theta} & \overline{D}_{\theta w} & -\tilde{R} & 0 \\ \overline{C}_w & \overline{D}_{w\theta} & \overline{D}_{ww} & 0 & -\gamma I \end{bmatrix} < 0 \quad (19)$$

solving the LMI (19) to obtain a fault estimator matrix $\Omega$;

step 5.3: obtaining a state space matrix of the fault estimator $K(s,\theta)$ $$\begin{bmatrix} A_K(\theta) & B_K(\theta) \\ C_K(\theta) & D_K(\theta) \end{bmatrix} = \begin{bmatrix} A_K & B_{K1} \\ C_{K1} & D_{K11} \end{bmatrix} + \begin{bmatrix} B_{K\theta} \\ D_{K1\theta} \end{bmatrix} \Delta_K(\theta)(I - D_{K\theta\theta}\Delta_K(\theta))^{-1} [C_{K\theta} \quad D_{K\theta 1}]. \quad (20)$$

The present invention has the beneficial effects: the method for fault diagnosis of the sensor and actuator of an aero-engine designed by the present invention respectively converts the LPV model and the fault estimator of the aero-engine into the time varying part and the LFT structure formed by the time varying part, wherein the time varying part is changed with the change of the time varying parameter vector. Thus, the fault estimator has a gain scheduling characteristic and can realize accurate estimation of the fault signal under the influence of uncertain conditions such as external perturbation and modeling errors, so as to facilitate in understanding information about the type, the generation time and the severity of the fault. In addition, the present invention reduces the design conservativeness of the fault estimator through the S process.

DETAILED DESCRIPTION

The embodiments of the present invention will be further described in detail below in combination with the drawings and the technical solution.

Figure 9:
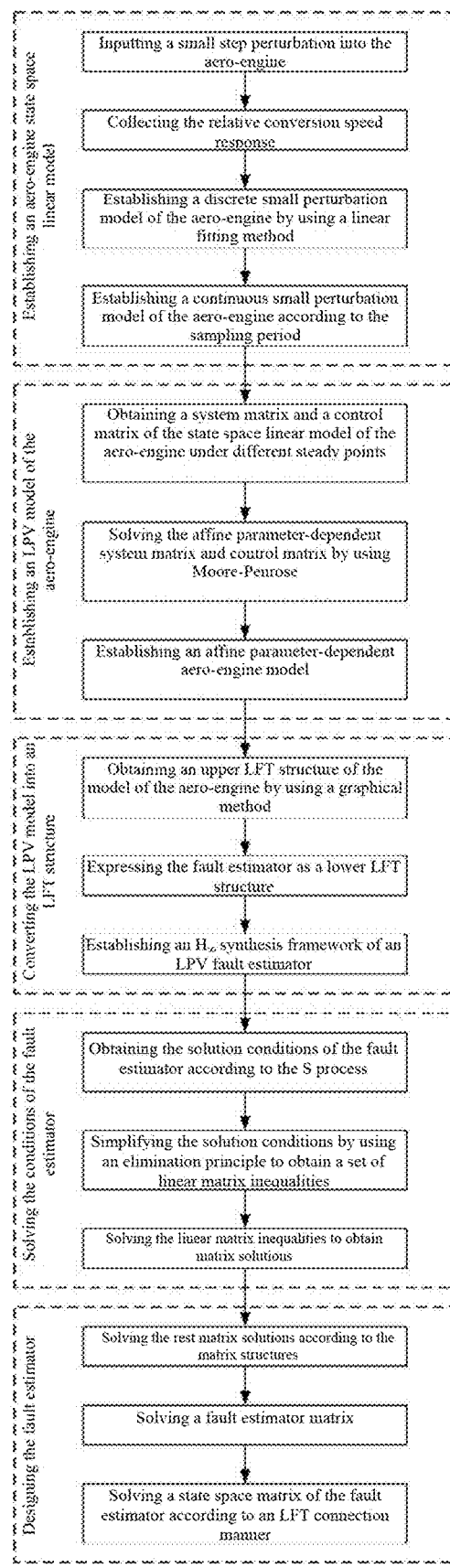
FIG. 9 is a flow chart of the present invention.

The flow chart of the present invention is shown in FIG. 9, and comprises the following specific steps:

step 1.1: inputting fuel pressure $p_f$ under steady operating points into an aero-engine; inputting a fuel pressure step signal $U_{pf1}$ with an amplitude of 0.01 $p_f$ into the aero-engine after relative conversion speed $n_h$ of a high pressure rotor of the aero-engine reaches a corresponding steady state; and respectively collecting relative conversion speed response $Y_{nh1}$ of the high pressure rotor and relative conversion speed response $Y_{nl1}$ of a low pressure rotor outputted by the aero-engine.

Step 1.2: repeating the above process for 13 times, i.e., respectively collecting the relative conversion speed response $Y_{nhi}$ of the high pressure rotor and the relative conversion speed response $Y_{nli}$ of the low pressure rotor under given fuel pressure $p_{fi}$ at balance points of 13 working conditions of ($H=0, Ma=0, n_h=88\%, 89\%, \ldots, 100\%$), wherein $i=1,2,3,\ldots,13$.

Step 1.3: by taking the fuel pressure step signal $U_{pfi}$ as an input variable and taking the relative conversion speed response $Y_{nhi}$ of the high pressure rotor and the relative conversion speed response $Y_{nli}$ of the low pressure rotor as state variables, expressing a discrete small perturbation state space model of the aero-engine as $$\begin{cases} x_{p_{k+1}} = E_i x_{p_k} + F_i u_k \\ y_{p_k} = G_i x_{p_k} + H_i u_k \end{cases} \quad (21)$$

wherein the state variable $x_p = [Y_{nl} \ Y_{nh}]^T \in R^n$; the input variable $u = U_{pf} \in R^t$; the output variable $y_p = Y_{nh} \in R^m$, $i=1, 2, 3, \ldots, 13$; the subscript k, k+1 are corresponding sampling moments; $E_i$, $F_i$, $G_i$ and $H_i$ are system state space matrices with appropriate dimensions; $R^n$, $R^t$ and $R^m$ respectively represent sets of real numbers with dimensions of n, t and m; T represents transposing for the matrices. According to the basic idea of the fitting method, a linear least square problem is established for formula (21), and the system matrices $E_i$, $F_i$, $G_i$, $H_i$ are solved by using the lsqnonlin function in MATLAB.

Figure 1:
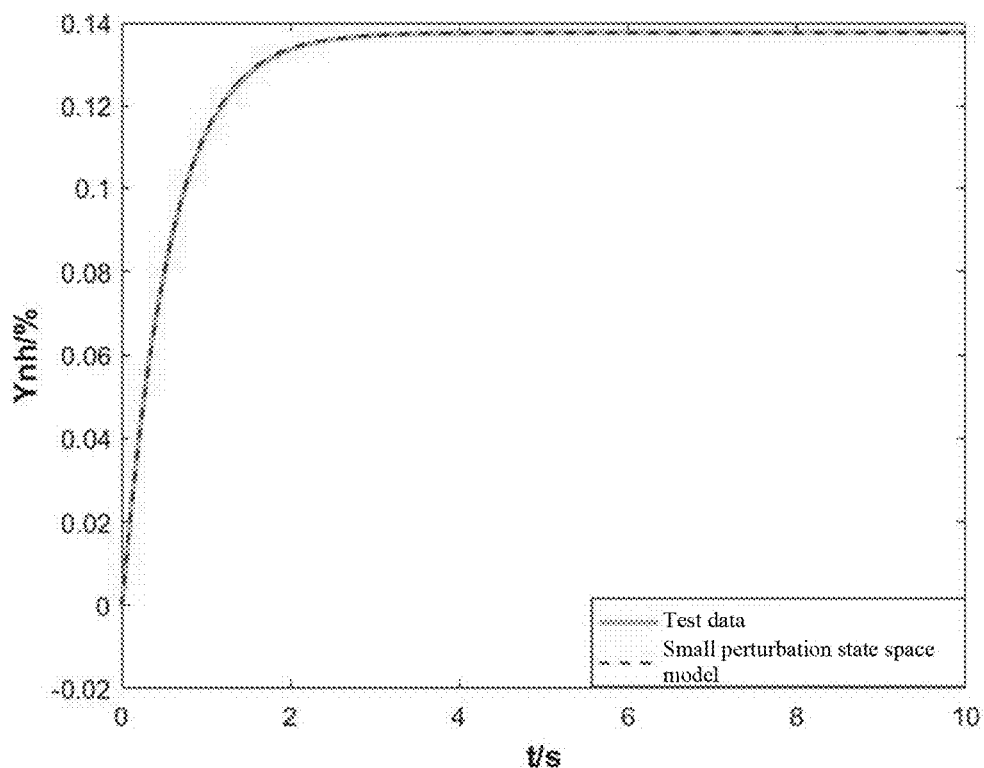
FIG. 1 is a contrast curve of relative conversion speed response $Y_{nh}$ of a high pressure rotor of a state space model of an aero-engine and test data under $H=0, Ma=0, n_2=90\%$ operating state.

Step 1.4: converting the discrete small perturbation state space model of the aero-engine under the steady operating points into a continuous small perturbation state space model according to a sampling period $T=25$ ms to obtain the state space model of the aero-engine;

$$\begin{cases} \dot{x}_p = A_{pi} x_p + B_{pi} u \\ y_p = C_{pi} x_p + D_{pi} u \end{cases} \quad (22)$$

wherein $A_{pi}$, $B_{pi}$, $C_{pi}$ and $D_{pi}$ are system state space matrices with appropriate dimensions; $C_{pi} = C_p = [0 \ 1]$, and $D_{pi} = D_p = 0$; and a relative conversion speed response $Y_{nh}$ curve of the high pressure rotor of the state space model at the operating pint $H=0, Ma=0, n_2=90\%$ is provided, as shown in FIG. 1, and has an average relative error of 0.26% relative to the test data.

Step 2.1: setting the relative conversion speed $n_{hi}$ of the high pressure rotor of the aero-engine as a scheduling parameter $\theta(i), i=1,2,3,\ldots,13$.

Step 2.2: expressing a system matrix $A_p(\theta)$ and a control matrix $B_p(\theta)$ of the continuous small perturbation state space model of the aero-engine as affine parameter-dependent forms, as follows:

$A_p(\theta) = A_0 + \theta A_1$ $B_p(\theta) = B_0 + \theta B_1 \quad (23)$ wherein $A_0$, $A_1$, $B_0$ and $B_1$ respectively represent coefficient matrices to be solved.

Rewriting the formula (23) into $$\begin{bmatrix} I & \theta(1)I \\ I & \theta(2)I \\ \vdots & \vdots \\ I & \theta(13)I \end{bmatrix} \begin{bmatrix} A_0 \\ A_1 \end{bmatrix} = \begin{bmatrix} A_p(\theta(1)) \\ A_p(\theta(2)) \\ \vdots \\ A_p(\theta(13)) \end{bmatrix}, \quad (24)$$

$$\begin{bmatrix} I & \theta(1)I \\ I & \theta(2)I \\ \vdots & \vdots \\ I & \theta(13)I \end{bmatrix} \begin{bmatrix} B_0 \\ B_1 \end{bmatrix} = \begin{bmatrix} B_p(\theta(1)) \\ B_p(\theta(2)) \\ \vdots \\ B_p(\theta(13)) \end{bmatrix}$$

wherein I is a unit matrix.
Then $$\begin{bmatrix} A_0 \\ A_1 \end{bmatrix} = \begin{bmatrix} I & \theta(1)I \\ I & \theta(2)I \\ \vdots & \vdots \\ I & \theta(13)I \end{bmatrix}^+ \begin{bmatrix} A_p(\theta(1)) \\ A_p(\theta(2)) \\ \vdots \\ A_p(\theta(13)) \end{bmatrix}, \quad (25)$$

$$\begin{bmatrix} B_0 \\ B_1 \end{bmatrix} = \begin{bmatrix} I & \theta(1)I \\ I & \theta(2)I \\ \vdots & \vdots \\ I & \theta(13)I \end{bmatrix}^+ \begin{bmatrix} B_p(\theta(1)) \\ B_p(\theta(2)) \\ \vdots \\ B_p(\theta(13)) \end{bmatrix}$$

The pinv function in MATLAB is used to solve Moore-Penrose pseudo-inverse $$\begin{bmatrix} I & \theta(1)I \\ I & \theta(2)I \\ \vdots & \vdots \\ I & \theta(13)I \end{bmatrix}^+ \text{ of } \begin{bmatrix} I & \theta(1)I \\ I & \theta(2)I \\ \vdots & \vdots \\ I & \theta(13)I \end{bmatrix},$$

and variable transformation is conducted on a variable parameter $\theta$, so that $\theta \in [-1,1]$, to obtain:

$$A_0 = \begin{bmatrix} -2.5839 & 0.5968 \\ 1.1613 & -4.3763 \end{bmatrix}, A_1 = \begin{bmatrix} 0.4287 & -2.3152 \\ 0.3138 & -0.7456 \end{bmatrix}, \quad (26)$$

$$B_0 = \begin{bmatrix} 0.0037 \\ 0.0021 \end{bmatrix}, B_1 = \begin{bmatrix} -0.0003 \\ -0.0002 \end{bmatrix}$$

Figure 2:
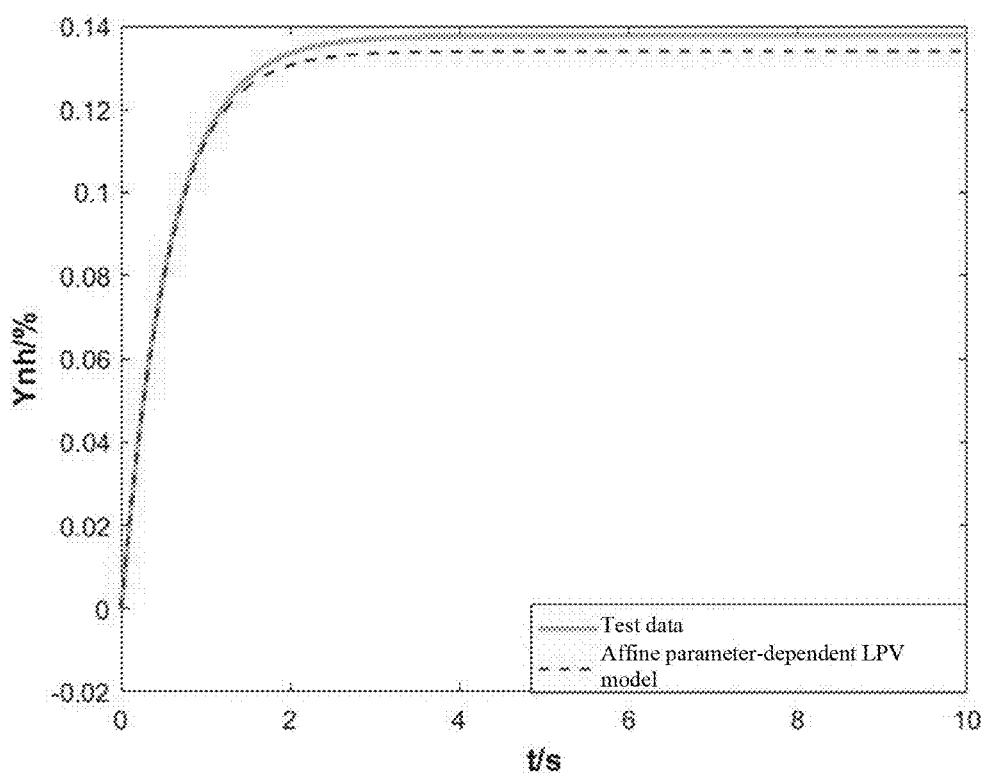
FIG. 2 is a contrast curve of relative conversion speed response $Y_{nh}$ of a high pressure rotor of an LPV model of an aero-engine and test data under $H=0, Ma=0, n_2=90\%$ operating state.

Step 2.3: establishing the affine parameter-dependent LPV model of the aero-engine $$\dot{x}_p = A_p(\theta)x_p + B_p(\theta)u$$

$$y_p = C_p x_p + D_p u \quad (27)$$

wherein a relative conversion speed response $Y_{nh}$ curve of the high pressure rotor of the LPV model of the aero-engine at the operating pint $H=0, Ma=0, n_2=90\%$ is provided, as shown in FIG. 2, and has an average relative error of 2.51% relative to the test data.

Step 3.1: expressing the affine parameter-dependent LPV model $P(s,\theta)$ of the aero-engine having perturbation and sensor and actuator fault into $$\dot{x}_p = A_p(\theta)x_p + B_p(\theta)u + E_p d + F_p f$$

$$y_p = C_p x_p + D_p u + G_p d + H_p f \quad (28)$$

wherein $d \in R^q$ is a perturbation signal and takes Gaussian white noise with standard deviation of 0.001; $f \in R^l$ is a fault signal comprising sensor fault and actuator fault, which respectively take sudden fault, slow fault and intermittent fault; $R^q$ and $R^l$ respectively represent sets of real numbers with dimensions of q and l; $E_p = \begin{bmatrix} 0.01 \\ 0 \end{bmatrix}, F_p = \begin{bmatrix} 0 \\ 0.1 \end{bmatrix}$, $G_p = 0.2$, $H_p = 1$.

Figure 3:
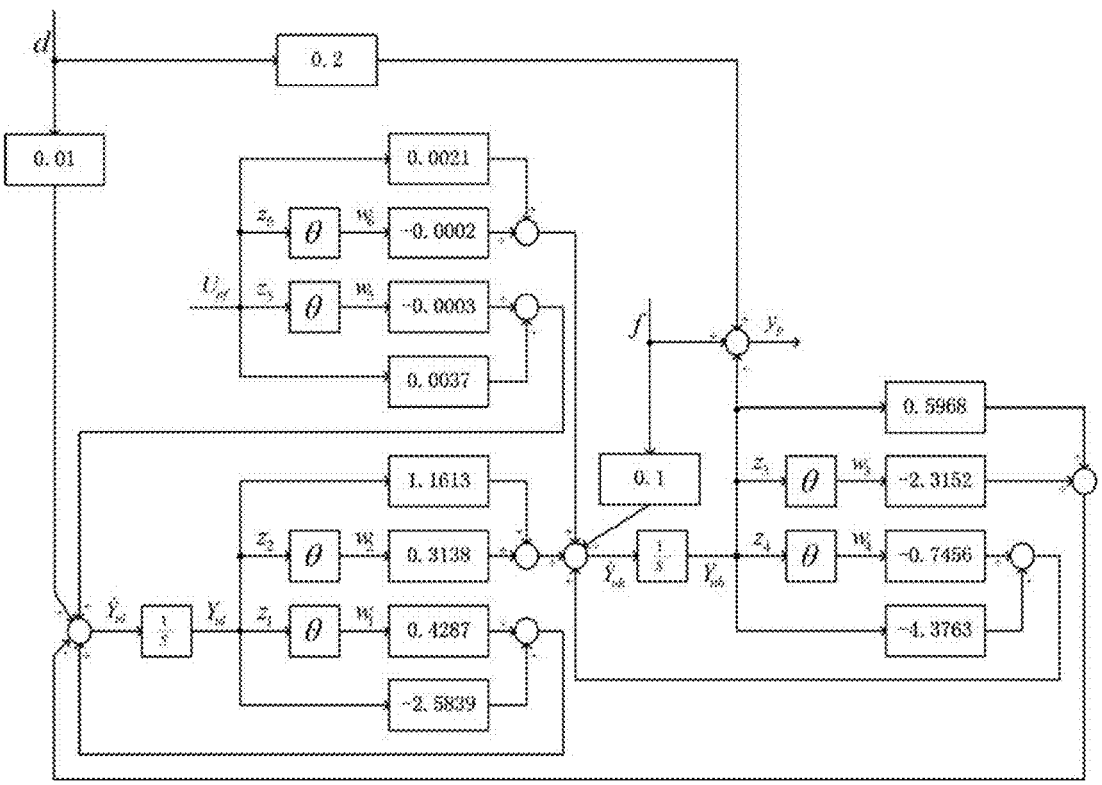
FIG. 3 is a structural diagram of an upper LFT of an LPV model $P(s,\theta)$ of an aero-engine.

The upper LFT structure of P(s,θ) can be expressed as the following formula, as shown in FIG. 3:

$$y_p = F_u(P', \Delta(\theta)) \begin{bmatrix} u \\ d \\ f \end{bmatrix} \quad (29)$$

wherein $F_u$ represents the upper LFT structure; P' represents a time-invariable part in $P(s,\theta)$; $\Delta(\theta) = \theta I$ represents a time varying part in $P(s,\theta)$, i.e., $$\begin{cases} \begin{bmatrix} \dot{x}_p \\ z_\theta \\ y_p \end{bmatrix} = \begin{bmatrix} A_p & B_{p\theta} & B_{pw} \\ C_{p\theta} & D_{p\theta\theta} & D_{p\theta w} \\ C_{pw} & D_{pw\theta} & D_{pww} \end{bmatrix} \begin{bmatrix} x_p \\ w_\theta \\ w \end{bmatrix}, w = \begin{bmatrix} u \\ d \\ f \end{bmatrix} \\ w_\theta = \Delta(\theta) z_\theta \end{cases} \quad (30)$$

wherein an external input variable is $w = [u^T \, d^T \, f^T]^T \in R^{p1}$; $w_\theta \in R^r$ is an output variable of a time varying part $\Delta(\theta) = \theta I$; $z_\theta \in R^r$ is an input variable of the time varying part $\Delta(\theta) = \theta I$; $R^{p1}$ and $R^r$ respectively represent sets of real numbers with dimensions of p1 and r; p1=t+q+l, i.e., the dimension p1 of the external input variable w is equal to the sum of the dimension t of the input variable u of the aero-engine, the dimension q of the perturbation signal d and the dimension l of the fault signal f; the system state space matrices are $$A_p = \begin{bmatrix} -2.5839 & 0.5968 \\ 1.1613 & -4.3763 \end{bmatrix} \quad (31)$$

$$B_p = \begin{bmatrix} 0.4287 & 0 & -2.3152 & 0 & -0.0003 & 0 \\ 0 & 0.3138 & 0 & -0.7456 & 0 & -0.0002 \end{bmatrix},$$

$$B_{pw} = \begin{bmatrix} 0.0037 & 0.01 & 0 \\ 0.0021 & 0 & 1 \end{bmatrix}$$

$$C_{p\theta} = \begin{bmatrix} 1 & 1 & 0 & 0 & 0 & 0 \\ 0 & 0 & 1 & 1 & 0 & 0 \end{bmatrix}^T, C_{pw} = \begin{bmatrix} 0 & 1 \end{bmatrix}$$

$$D_{p\theta\theta} = 0_{6\times 6}, D_{p\theta w} = \begin{bmatrix} 0 & 0 & 0 & 0 & 1 & 1 \\ 0 & 0 & 0 & 0 & 0 & 0 \\ 0 & 0 & 0 & 0 & 0 & 0 \end{bmatrix}^T,$$

$$D_{pw\theta} = 0_{1\times 6}, D_{pww} = \begin{bmatrix} 0 & 0.2 & 1 \end{bmatrix}$$

Step 3.2: setting the form of the fault estimator $K(s,\theta)$ as follows $$\begin{cases} \dot{x}_K = A_K(\theta)x_K + B_K(\theta)u_K \\ \hat{f} = C_K(\theta)x_K + D_K(\theta)u_K \end{cases} \quad (32)$$

wherein $X_K \in R^k$ is a state variable of the fault estimator K (s,θ); $u_K = [u^T \, y_p^T]^T \in R^{p2}$ is an input variable of $K(s,\theta)$; p2=t+m, i.e., the dimension p2 of the input variable $u_K$ of K (s,θ) is equal to the sum of the dimension t of the input variable u of the aero-engine and the dimension m of the output variable $y_p$ of the aero-engine; $\hat{f} \in R^l$ is an output variable of K (s,θ), i.e., the estimated value of the fault signal f; $A_K(\theta)$, $B_K(\theta)$, $C_K(\theta)$ and $D_K(\theta)$ are system state space matrices. K(s,θ) is expressed as a lower LFT structure as follows:

$$\hat{f} = F_l(K', \Delta_K(\theta)) \begin{bmatrix} u \\ y_p \end{bmatrix} \quad (33)$$

wherein $F_l$ represents the lower LFT structure; K' represents a time-invariable part in K(s,θ); $\Delta_K(\theta) = \theta I$ represents a time varying part in K(s,θ), i.e., $$\begin{cases} \begin{bmatrix} \dot{x}_K \\ \hat{f} \\ z_K \end{bmatrix} = \begin{bmatrix} A_K & B_{K1} & B_{K\theta} \\ C_{K1} & D_{K11} & D_{K1\theta} \\ C_{K\theta} & D_{K\theta 1} & D_{K\theta\theta} \end{bmatrix} \begin{bmatrix} x_K \\ u_K \\ w_K \end{bmatrix}, u_k = \begin{bmatrix} u \\ y_p \end{bmatrix} \\ w_K = \Delta_K(\theta) z_K \end{cases} \quad (34)$$

wherein $w_K \in R^r$ is an output variable of the time varying part $\Delta_K(\theta) = \theta I$; $z_K \in R^r$ is an input variable of the time varying part $\Delta_K(\theta) = \theta I$; $A_K$, $B_{K1}$, $B_{K\theta}$, $C_{K1}$, $C_{K\theta}$, $D_{K11}$, $D_{K1\theta}$, $D_{K\theta 1}$ and $D_{K\theta\theta}$ are system state space matrices with appropriate dimensions.

Figure 4:
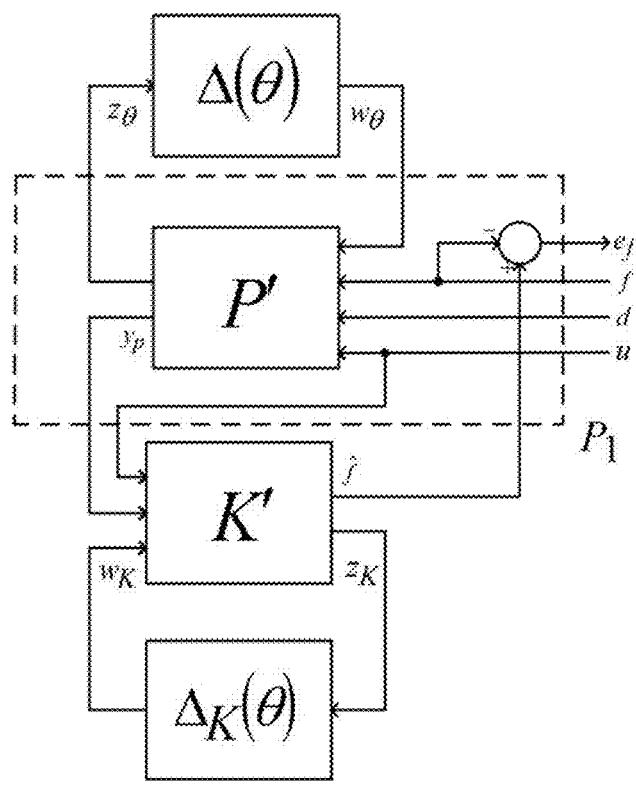
FIG. 4 is a system structural diagram under an LFT framework.

Step 3.3: showing a system connection diagram under the LFT framework in FIG. 4, and giving a state space expression of the system $P_1$ in FIG. 4 as $$\begin{bmatrix} \dot{x} \\ z_\theta \\ e_f \\ u_k \end{bmatrix} = \begin{bmatrix} A & B_\theta & B_1 & B_2 \\ C_\theta & D_{\theta\theta} & D_{\theta 1} & D_{\theta 2} \\ C_1 & D_{1\theta} & D_{11} & D_{12} \\ C_2 & D_{2\theta} & D_{21} & D_{22} \end{bmatrix} \begin{bmatrix} x \\ w_\theta \\ w \\ \hat{f} \end{bmatrix} \quad (35)$$

wherein system matrix $A = A_p$; system matrix $B_\theta = B_{p\theta}$; system matrix $B_1 = B_{pw}$; system matrix $B_2 = 0_{n \times l}$; system matrix $C_\theta = C_{p\theta}$; system matrix $D_{\theta\theta} = D_{p\theta\theta}$; system matrix $D_{\theta 1} = D_{p\theta w}$; system matrix $D_{\theta 2} = 0_{r \times l}$; system matrix $C_1 = 0_{p1 \times n}$; system matrix $D_{1\theta} = 0_{p1 \times r}$; system matrix $$D_{11} = \begin{bmatrix} 0_{l \times (p1-l)} & -I_l \\ 0_{(p1-l) \times (p1-l)} & 0_{(p1-l) \times l} \end{bmatrix};$$

system matrix $$D_{12} = \begin{bmatrix} I_l \\ 0_{(p1-l) \times l} \end{bmatrix};$$

system matrix $$C_2 = \begin{bmatrix} 0_{t \times n} \\ C_{pw} \end{bmatrix};$$

system matrix $$D_{2\theta} = \begin{bmatrix} 0_{t \times r} \\ D_{pw\theta} \end{bmatrix};$$

system matrix $$D_{21} = \begin{bmatrix} I_t & 0_{t \times q} & 0_{t \times l} \\ & D_{pww} & \end{bmatrix};$$

$D_{22} = 0_{p2 \times l}$; n represents the dimension of the state variable $x_p$ of the aero-engine; r represents the dimension of the output variable $w_\theta$ of the time varying part $\Delta(\theta)$ and the output variable $w_K$ of the time varying part $\Delta_K(\theta)$.

Figure 5:
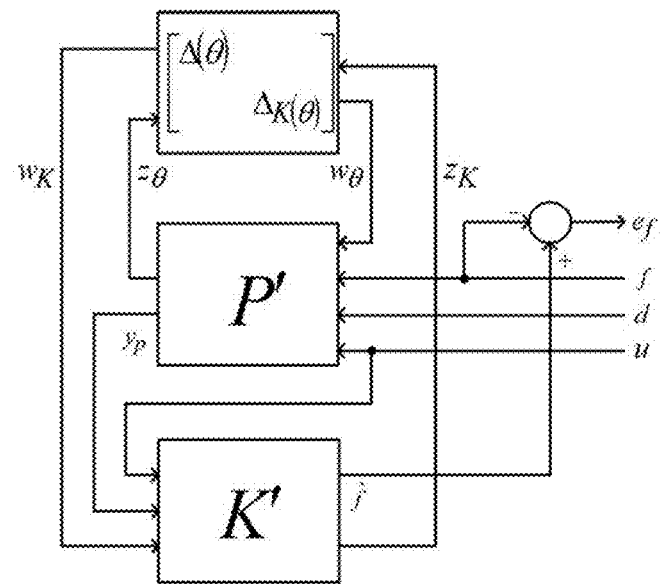
FIG. 5 is an $H_\infty$ synthesis framework of an LPV fault estimator.
Figure 6A:
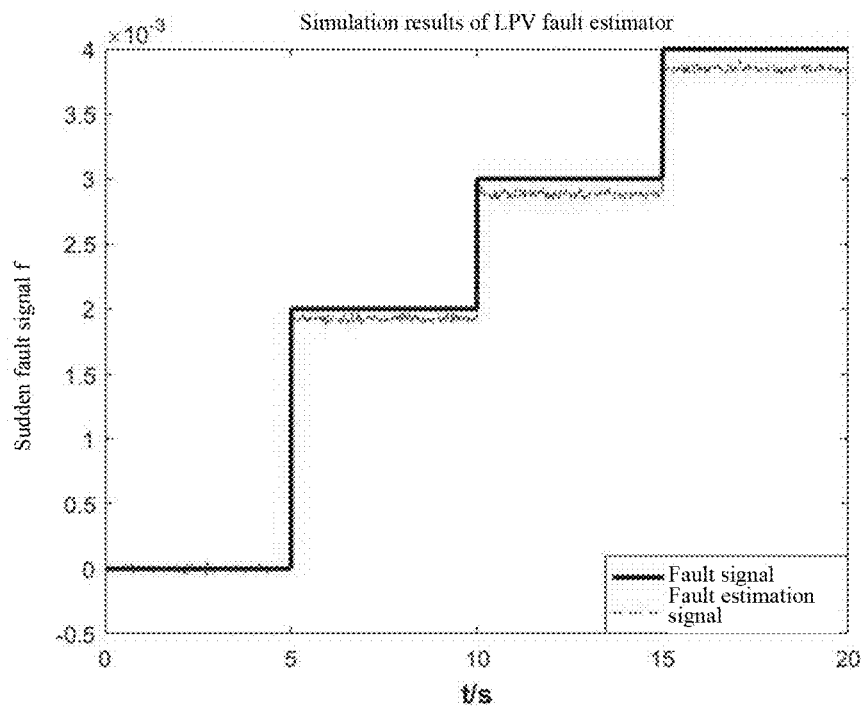
FIG. 6(*a*) and FIG. 6(*b*) are simulation results of sudden fault estimation.
Figure 6B:
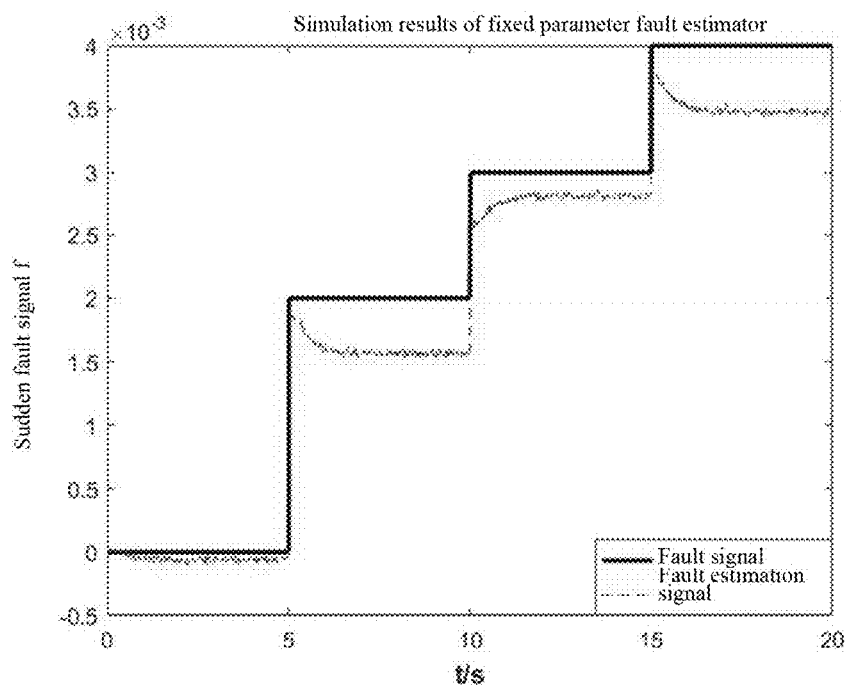
Figure 7A:
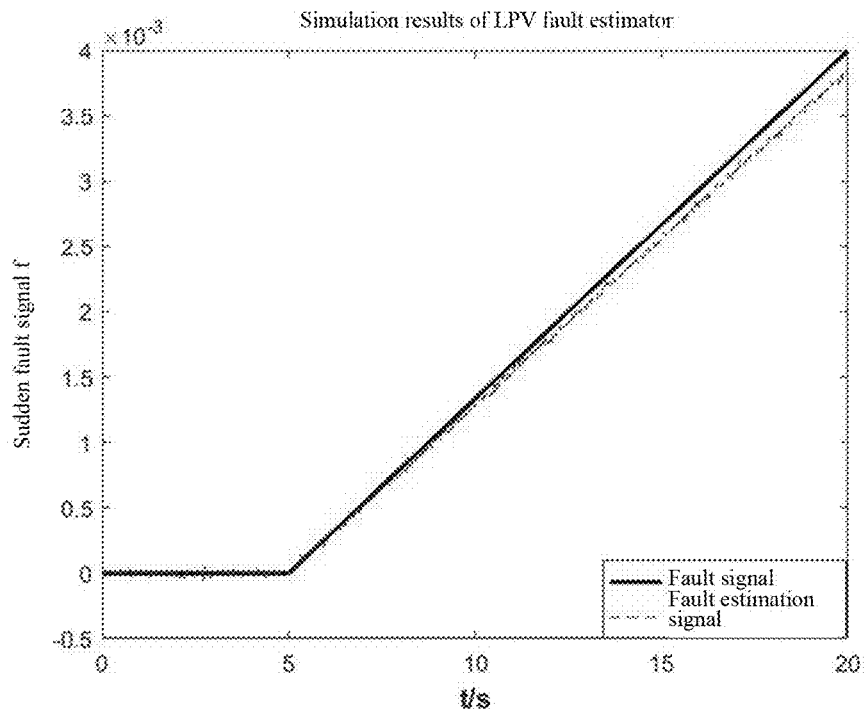
FIG. 7(*a*) and FIG. 7(*b*) are simulation results of slow fault estimation.
Figure 7B:
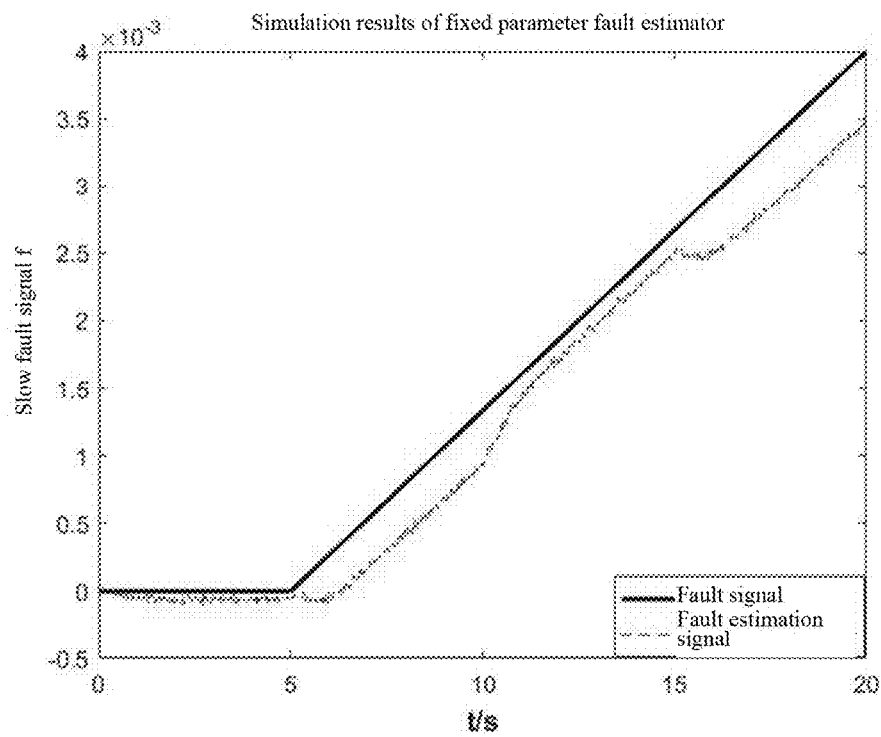
Figure 8A:
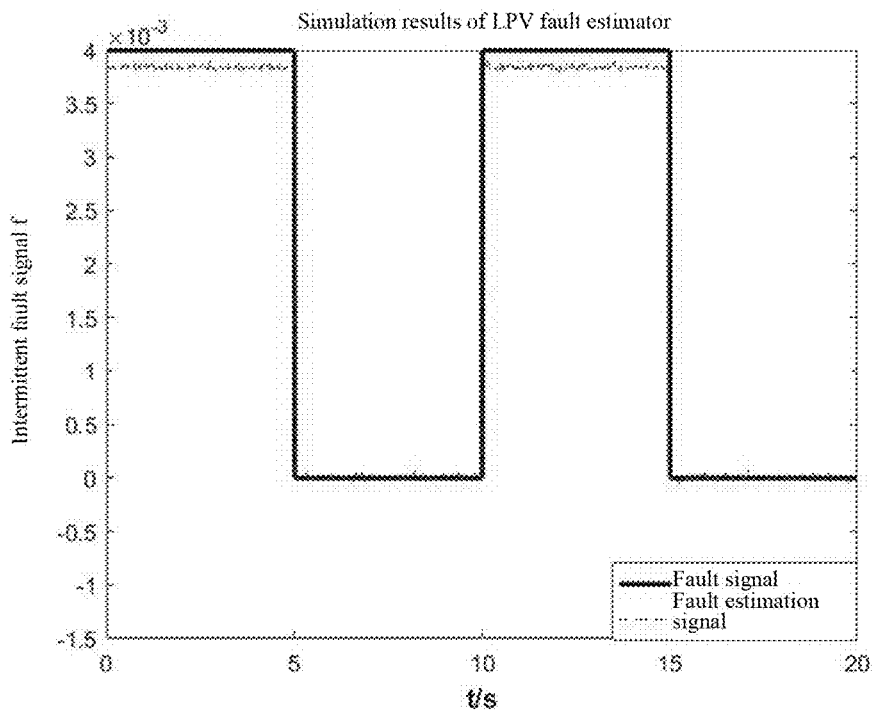
FIG. 8(*a*) and FIG. 8(*b*) are simulation results of intermittent fault estimation.
Figure 8B:
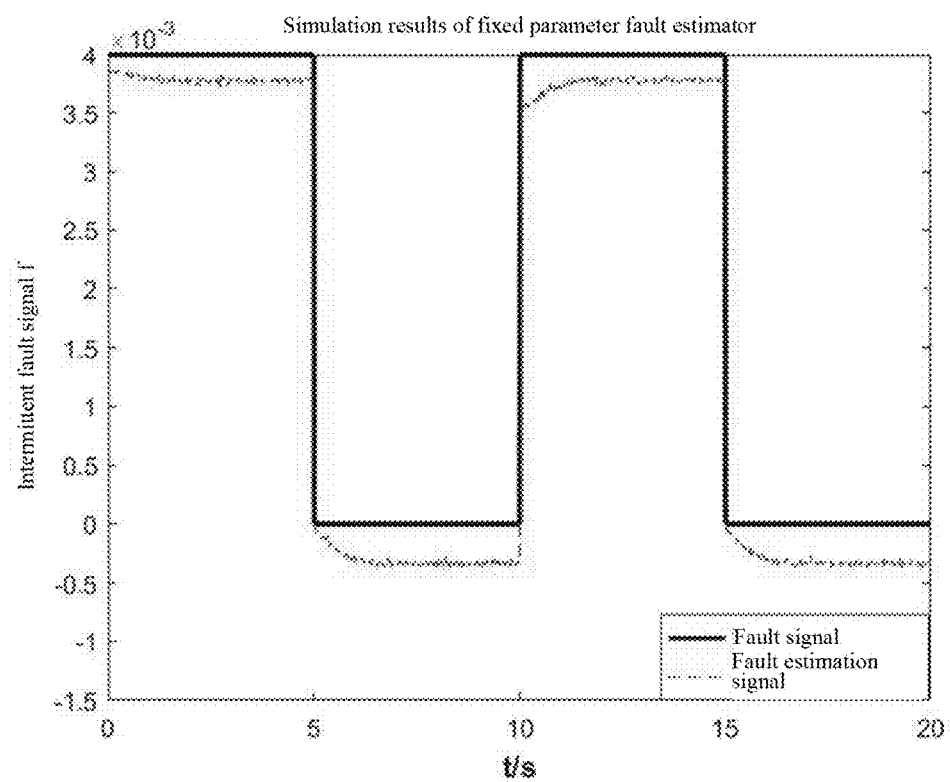

According to the time varying part $\Delta(\theta)$ in the LPV model P(s,θ) of the aero-engine and the time varying part $\Delta_K(\theta)$ in the fault estimator K (s,θ), expressing the $H_\infty$ synthesis framework of the LPV fault estimator as follows, as shown in FIG. 5

$$\begin{bmatrix} \dot{x} \\ \dot{x}_K \\ z_K \\ z_\theta \\ e_f \end{bmatrix} = \begin{bmatrix} \overline{A} & \overline{B}_\theta & \overline{B}_w \\ \overline{C}_\theta & \overline{D}_{\theta\theta} & \overline{D}_{\theta w} \\ \overline{C}_w & \overline{D}_{w\theta} & \overline{D}_{ww} \end{bmatrix} \begin{bmatrix} x \\ x_K \\ w_K \\ w_\theta \\ w \end{bmatrix} \quad (36)$$

wherein $e_f = \hat{f} - f$ is a fault estimation error, i.e., an output variable of the $H_\infty$ synthesis framework of the LPV fault estimator; system matrix $\overline{A} = A_0 + T_1 \Omega T_2$; system matrix $\overline{B}_\theta = B_{01} + T_1 \Omega T_3$; system matrix $\overline{B}_w = B_{02} + T_1 \Omega T_4$; system matrix $\overline{C}_\theta = C_{01} + T_5 \Omega T_2$; system matrix $\overline{D}_{\theta\theta} = D_{01} + T_5 \Omega T_3$; system matrix $\overline{D}_{\theta w} = D_{02} + T_5 \Omega T_4$; system matrix $\overline{C}_w = C_{02} + T_6 \Omega T_2$; system matrix $\overline{D}_{w\theta} = D_{03} + T_6 \Omega T_3$; system matrix $\overline{D}_{ww} = D_{04} + T_6 \Omega T_4$; fault estimator matrix $$\Omega = \begin{bmatrix} A_K & B_{K1} & B_{K\theta} \\ C_{K1} & D_{K11} & D_{K1\theta} \\ C_{K\theta} & D_{K\theta 1} & D_{K\theta\theta} \end{bmatrix};$$

matrix $$T_1 = \begin{bmatrix} 0 & B_2 & 0_{n \times r} \\ I_k & 0 & 0 \end{bmatrix};$$

matrix $$T_2 = \begin{bmatrix} 0 & I_k \\ C_2 & 0 \\ 0_{r \times n} & 0 \end{bmatrix};$$

matrix $$T_3 = \begin{bmatrix} 0_{k \times r} & 0 \\ 0 & D_{2\theta} \\ I_r & 0 \end{bmatrix};$$

matrix $$T_4 = \begin{bmatrix} 0_{k \times p1} \\ D_{21} \\ 0_{r \times p1} \end{bmatrix};$$

matrix $$T_5 = \begin{bmatrix} 0_{r \times k} & 0 & I_r \\ 0 & D_{\theta 2} & 0 \end{bmatrix};$$

matrix $T_6 = [0_{p1 \times k} \; D_{12} \; 0_{p1 \times r}]$; matrix $$A_0 = \begin{bmatrix} A & 0 \\ 0 & 0_k \end{bmatrix};$$

matrix $$B_{01} = \begin{bmatrix} 0 & B_\theta \\ 0_{k \times r} & 0 \end{bmatrix};$$

matrix $$B_{02} = \begin{bmatrix} B_1 \\ 0_{k \times p1} \end{bmatrix};$$

matrix $$C_{01} = \begin{bmatrix} 0 & 0_{r \times k} \\ C_\theta & 0 \end{bmatrix};$$

matrix $$D_{01} = \begin{bmatrix} 0_r & 0 \\ 0 & D_{\theta\theta} \end{bmatrix};$$

matrix $$D_{02} = \begin{bmatrix} 0_{r \times p1} \\ D_{\theta 1} \end{bmatrix};$$

matrix $C_{02} = [C_1 \; 0_{p1 \times k}]$; matrix $D_{03} = [0_{p1 \times r} \; D_{1\theta}]$; and matrix $D_{04} = D_{11}$.

Step 4.1: if there is a symmetric positive-definite matrix X, the symmetrical matrix $$P = \begin{bmatrix} Q & S \\ S^T & R \end{bmatrix}$$

making the formula (37) and the formula (38) valid;

$$\begin{bmatrix} I & 0 & 0 \\ 0 & I & 0 \\ 0 & 0 & I \\ \overline{A} & \overline{B}_\theta & \overline{B}_w \\ \overline{C}_\theta & \overline{D}_{\theta\theta} & \overline{D}_{\theta w} \\ \overline{C}_w & \overline{D}_{w\theta} & \overline{D}_{ww} \end{bmatrix}^T \begin{bmatrix} 0 & 0 & 0 & X & 0 & 0 \\ 0 & Q & 0 & 0 & S & 0 \\ 0 & 0 & -\gamma I & 0 & 0 & 0 \\ X & 0 & 0 & 0 & 0 & 0 \\ 0 & S^T & 0 & 0 & R & 0 \\ 0 & 0 & 0 & 0 & 0 & \frac{1}{\gamma}I \end{bmatrix} \begin{bmatrix} I & 0 & 0 \\ 0 & I & 0 \\ 0 & 0 & I \\ \overline{A} & \overline{B}_\theta & \overline{B}_w \\ \overline{C}_\theta & \overline{D}_{\theta\theta} & \overline{D}_{\theta w} \\ \overline{C}_w & \overline{D}_{w\theta} & \overline{D}_{ww} \end{bmatrix} < 0 \quad (37)$$

$$\begin{bmatrix} \Delta(\theta) & 0 \\ 0 & \Delta_K(\theta) \\ I & 0 \\ 0 & I \end{bmatrix}^T P \begin{bmatrix} \Delta(\theta) & 0 \\ 0 & \Delta_K(\theta) \\ I & 0 \\ 0 & I \end{bmatrix} > 0 \quad (38)$$

A closed-loop system (36) is asymptotically stable, and the $L_2$ induced norm of the closed-loop transfer function from the external input w to the fault estimation error $e_f$ is smaller than a performance index $\gamma(\gamma>0)$. Namely, the solution conditions of the fault estimator $K(s,\theta)$ are formula (37) and formula (38), wherein Q, S and R respectively represent sub-block matrices of P.

Step 4.2: partitioning the symmetric positive-definite matrix X and an inverse matrix $X^{-1}$ thereof;

$$X = \begin{bmatrix} L & M \\ M^T & E \end{bmatrix}, X^{-1} = \begin{bmatrix} J & N \\ N^T & F \end{bmatrix} \quad (39)$$

wherein L, M and E respectively represent block matrices of X; J, N and F respectively represent sub-block matrices of $X^{-1}$.

Because x is the symmetric positive-definite matrix, then $$\begin{bmatrix} L & I \\ I & J \end{bmatrix} > 0 \quad (40)$$

Partitioning the full block scaling matrix P and the inverse matrix $\tilde{P}$ thereof $$P = \begin{bmatrix} Q & S \\ S^T & R \end{bmatrix} = \begin{bmatrix} Q_1 & Q_2 & S_1 & S_2 \\ Q_2^T & Q_3 & S_3 & S_4 \\ \hline S_1^T & S_3^T & R_1 & R_2 \\ S_2^T & S_4^T & R_2^T & R_3 \end{bmatrix}, \quad (41)$$

$$\tilde{P} = \begin{bmatrix} \tilde{Q} & \tilde{S} \\ \tilde{S}^T & \tilde{R} \end{bmatrix} = \begin{bmatrix} \tilde{Q}_1 & \tilde{Q}_2 & \tilde{S}_1 & \tilde{S}_2 \\ \tilde{Q}_2^T & \tilde{Q}_3 & \tilde{S}_3 & \tilde{S}_4 \\ \hline \tilde{S}_1^T & \tilde{S}_3^T & \tilde{R}_1 & \tilde{R}_2 \\ \tilde{S}_2^T & \tilde{S}_4^T & \tilde{R}_2^T & \tilde{R}_3 \end{bmatrix}$$

wherein $Q_1$, $Q_2$ and $Q_3$ respectively represent sub-block matrices of Q; $S_1$, $S_2$, $S_3$ and $S_4$ respectively represent sub-block matrices of S; $R_1$, $R_2$ and $R_3$ respectively represent sub-block matrices of R; $\tilde{Q}$, $\tilde{S}$ and $\tilde{R}$ respectively represent sub-block matrices of $\tilde{P}$; $\tilde{Q}_1$, $\tilde{Q}_2$ and $\tilde{Q}_3$ respectively represent sub-block matrices of $\tilde{Q}$; $\tilde{S}_1$, $\tilde{S}_2$, $\tilde{S}_3$ and $\tilde{S}_4$ respectively represent sub-block matrices of $\tilde{S}$; $\tilde{R}_1$, $\tilde{R}_2$ and $\tilde{R}_3$ respectively represent sub-block matrices of $\tilde{R}$.

Arranging the LMI (37) as $$\begin{bmatrix} I \\ U\Gamma V + Z \end{bmatrix}^T \begin{bmatrix} 0 & 0 & 0 & 0 & 0 & L & M & 0 & 0 & 0 \\ 0 & 0 & 0 & 0 & 0 & M^T & E & 0 & 0 & 0 \\ 0 & 0 & Q_1 & Q_2 & 0 & 0 & 0 & S_1 & S_2 & 0 \\ 0 & 0 & Q_2^T & Q_3 & 0 & 0 & 0 & S_3 & S_4 & 0 \\ 0 & 0 & 0 & 0 & -\gamma I & 0 & 0 & 0 & 0 & 0 \\ L & M & 0 & 0 & 0 & 0 & 0 & 0 & 0 & 0 \\ M^T & E & 0 & 0 & 0 & 0 & 0 & 0 & 0 & 0 \\ 0 & 0 & S_1^T & S_3^T & 0 & 0 & 0 & R_1 & R_2 & 0 \\ 0 & 0 & S_2^T & S_4^T & 0 & 0 & 0 & R_2^T & R_3 & 0 \\ 0 & 0 & 0 & 0 & 0 & 0 & 0 & 0 & 0 & \frac{1}{\gamma}I \end{bmatrix} \begin{bmatrix} I \\ U\Gamma V + Z \end{bmatrix} < 0 \quad (42)$$

wherein matrix $$Z = \begin{bmatrix} A_0 & B_{01} & B_{02} \\ C_{01} & D_{01} & D_{02} \\ C_{02} & D_{03} & D_{04} \end{bmatrix};$$

matrix $$U = \begin{bmatrix} T_1 \\ T_5 \\ T_6 \end{bmatrix};$$

matrix $V = [T_2 \; T_3 \; T_4]$; and matrix $\Gamma = \Omega$.

To satisfy the formula (38), it is required to verify that the formula (38) is valid on all possible tracks of the variable parameter θ, which is impossible. Therefore, the structure of the full block scaling matrix $$P = \begin{bmatrix} Q & S \\ S^T & R \end{bmatrix}$$

is limited to make it valid. For each variable parameter θ, when R≥0, the following formula is valid $$\begin{bmatrix} \theta I \\ I \end{bmatrix}^T \begin{bmatrix} Q & S \\ S^T & R \end{bmatrix} \begin{bmatrix} \theta I \\ I \end{bmatrix} = \quad (43)$$

$$\theta^2 Q + R + \theta(S^T + S) \geq \theta^2(Q+R) + \theta(S^T + S) \geq 0$$

Therefore, Q=−R, and S+$S^T$=0. Namely, the formula (38) is arranged as $$R > 0, \; Q = -R, \; S + S^T = 0 \quad (44)$$

To sum up, the solution conditions of the fault estimator K(s,θ) are converted into formula (40), formula (42) and formula (44).

Step 4.3: arranging the LMI (42) as $$V_\perp^T \begin{bmatrix} I \\ Z \end{bmatrix}^T W \begin{bmatrix} I \\ Z \end{bmatrix} V_\perp < 0 \quad (45)$$

$$U_\perp^T \begin{bmatrix} -Z^T \\ I \end{bmatrix}^T W^{-1} \begin{bmatrix} -Z^T \\ I \end{bmatrix} U_\perp > 0 \quad (46)$$

wherein $U_\perp$ and $V_\perp$ are respectively the bases of the nuclear spaces of $U^T$ and V.

$$W = \begin{bmatrix} 0 & 0 & 0 & 0 & 0 & L & M & 0 & 0 & 0 \\ 0 & 0 & 0 & 0 & 0 & M^T & E & 0 & 0 & 0 \\ 0 & 0 & Q_1 & Q_2 & 0 & 0 & 0 & S_1 & S_2 & 0 \\ 0 & 0 & Q_2^T & Q_3 & 0 & 0 & 0 & S_3 & S_4 & 0 \\ 0 & 0 & 0 & 0 & -\gamma I & 0 & 0 & 0 & 0 & 0 \\ L & M & 0 & 0 & 0 & 0 & 0 & 0 & 0 & 0 \\ M^T & E & 0 & 0 & 0 & 0 & 0 & 0 & 0 & 0 \\ 0 & 0 & S_1^T & S_3^T & 0 & 0 & 0 & R_1 & R_2 & 0 \\ 0 & 0 & S_2^T & S_4^T & 0 & 0 & 0 & R_2^T & R_3 & 0 \\ 0 & 0 & 0 & 0 & 0 & 0 & 0 & 0 & 0 & \frac{1}{\gamma}I \end{bmatrix}$$

Simplifying the LMIs (45) and (46) through simple calculation as $$N_L^T \begin{bmatrix} I & 0 & 0 \\ 0 & I & 0 \\ 0 & 0 & I \\ A & B_\theta & B_1 \\ C_\theta & D_{\theta\theta} & D_{\theta 1} \\ C_1 & D_{1\theta} & D_{11} \end{bmatrix}^T \begin{bmatrix} 0 & 0 & 0 & L & 0 & 0 \\ 0 & Q_3 & 0 & 0 & S_4 & 0 \\ 0 & 0 & -\gamma I & 0 & 0 & 0 \\ L & 0 & 0 & 0 & 0 & 0 \\ 0 & S_4^T & 0 & 0 & R_3 & 0 \\ 0 & 0 & 0 & 0 & 0 & \frac{1}{\gamma}I \end{bmatrix} \quad (47)$$

$$\begin{bmatrix} I & 0 & 0 \\ 0 & I & 0 \\ 0 & 0 & I \\ A & B_\theta & B_1 \\ C_\theta & D_{\theta\theta} & D_{\theta 1} \\ C_1 & D_{1\theta} & D_{11} \end{bmatrix} N_L < 0$$

$$N_J^T \begin{bmatrix} -A^T & -C_\theta^T & -C_1^T \\ -B_\theta^T & -D_{\theta\theta}^T & -D_{1\theta}^T \\ -B_1^T & -D_{\theta 1}^T & -D_{11}^T \\ I & 0 & 0 \\ 0 & I & 0 \\ 0 & 0 & I \end{bmatrix}^T \begin{bmatrix} 0 & 0 & 0 & J & 0 & 0 \\ 0 & \tilde{Q}_3 & 0 & 0 & \tilde{S}_4 & 0 \\ 0 & 0 & -\frac{1}{\gamma}I & 0 & 0 & 0 \\ J & 0 & 0 & 0 & 0 & 0 \\ 0 & \tilde{S}_4^T & 0 & 0 & \tilde{R}_3 & 0 \\ 0 & 0 & 0 & 0 & 0 & \gamma I \end{bmatrix} \quad (48)$$

$$\begin{bmatrix} -A^T & -C_\theta^T & -C_1^T \\ -B_\theta^T & -D_{\theta\theta}^T & -D_{1\theta}^T \\ -B_1^T & -D_{\theta 1}^T & -D_{11}^T \\ I & 0 & 0 \\ 0 & I & 0 \\ 0 & 0 & I \end{bmatrix} N_J > 0$$

wherein $N_L$ and $N_J$ respectively represent the bases of the nuclear spaces of $[C_2\ D_{2\theta}\ D_{21}]$ and $[B_2^T\ D_{\theta 2}^T\ D_{12}^T]$.

Step 4.4: solving the LMIs (40), (44), (47) and (48) by using an LMI toolkit in MATLAB to obtain an optimal $\gamma$ value of 0.21 and corresponding matrix solutions L, J, $Q_3$, $\tilde{R}_3$, $S_4$ and $\tilde{S}_4$.

Step 5.1: solving the symmetric positive-definite matrix X, the full block scaling matrix P and the inverse matrix $\tilde{P}$ thereof from the formulas (39) and (41) according to the solved matrix solutions L, J, $Q_3$, $\tilde{R}_3$, $S_4$ and $\tilde{S}_4$.

Step 5.2: according to Schur complement Lemma, expressing the LMI (37) as $$\begin{bmatrix} \bar{A}^T X + X\bar{A} & X\bar{B}_\theta + \bar{C}_\theta^T S^T & X\bar{B}_w & \bar{C}_\theta^T & \bar{C}_w^T \\ \bar{B}_\theta^T X + S\bar{C}_\theta & Q + \bar{D}_{\theta\theta}^T S^T + S\bar{D}_{\theta\theta} & S\bar{D}_{\theta w} & \bar{D}_{\theta\theta}^T & \bar{D}_{w\theta}^T \\ \bar{B}_w^T X & \bar{D}_{\theta w}^T S^T & -\gamma I & \bar{D}_{\theta w}^T & \bar{D}_{ww}^T \\ \bar{C}_\theta & \bar{D}_{\theta\theta} & \bar{D}_{\theta w} & -\tilde{R} & 0 \\ \bar{C}_w & \bar{D}_{w\theta} & \bar{D}_{ww} & 0 & -\gamma I \end{bmatrix} < 0 \quad (49)$$

Substituting the value in the closed-loop system (36) to obtain $$\Psi + \bar{P}^T \Omega^T \bar{Q}_x + \bar{Q}_x^T \Omega \bar{P} < 0 \quad (50)$$

wherein $$\Psi = \begin{bmatrix} A_0^T X + XA_0 & XB_{01} + C_{01}^T S^T & XB_{02} & C_{01}^T & C_{02}^T \\ B_{01}^T X + SC_{01} & Q + D_{01}^T S^T + SD_{01} & SD_{02} & D_{01}^T & D_{03}^T \\ B_{02}^T X & D_{02}^T S^T & -\gamma I & D_{02}^T & D_{04}^T \\ C_{01} & D_{01} & D_{02} & -\tilde{R} & 0 \\ C_{02} & D_{03} & D_{04} & 0 & -\gamma I \end{bmatrix},$$

$\bar{P}=[T_2\ T_3\ T_4\ 0\ 0]$ and $\bar{Q}_x=[T_1^T X\ T_5^T S^T\ 0\ T_5^T\ T_6^T]$.

Solving the LMI (50) to obtain a fault estimator matrix $\Omega$.

Step 5.3: obtaining a state space matrix of the fault estimator $K(s,\theta)$ $$\begin{bmatrix} A_K(\theta) & B_K(\theta) \\ C_K(\theta) & D_K(\theta) \end{bmatrix} = \begin{bmatrix} A_K & B_{K1} \\ C_{K1} & D_{K1} \end{bmatrix} + \begin{bmatrix} B_{K\theta} \\ D_{K1\theta} \end{bmatrix} \quad (51)$$

$$\Delta_K(\theta)(I - D_{K\theta\theta}\Delta_K(\theta))^{-1}[C_{K\theta}\ D_{K\theta 1}]$$

Simulation results at the operating points H=0 km, Ma=0, $n_2$=90% are shown in FIG. 6(a), FIG. 6(b), FIG. 7(a), FIG. 7(b), FIG. 8(a) and FIG. 8(b), and are compared with the standard $H_\infty$ method. The simulation results show that the fixed parameter fault estimator designed by the standard $H_\infty$ method cannot well cope with the change of the variable parameters. The LPV fault estimator designed by the present invention can rapidly detect the fault in the system and accurately reconstruct the fault signal, and has obvious performance advantages.

We claim:

1. A method for fault diagnosis of the sensor and actuator of an aero-engine based on LFT, comprising the following steps:
    step 1: establishing an aero-engine state space model using a combination of a small perturbation method and a linear fitting method;
    step 1.1: inputting fuel pressure $p_f$ under steady operating points into an aero-engine; inputting a fuel pressure step signal $U_{pf1}$ with an amplitude of 0.01 $p_f$ into the aero-engine after relative conversion speed $n_h$ of a high pressure rotor of the aero-engine reaches a corresponding steady state; and respectively collecting relative conversion speed response $Y_{nh1}$ of the high pressure rotor and relative conversion speed response $Y_{nl1}$ of a low pressure rotor outputted by the aero-engine;
    step 1.2: repeating the process of the step 1 for N times; and respectively collecting the relative conversion speed response $Y_{nhi}$ of the high pressure rotor and the relative conversion speed response $Y_{nli}$ of the low pressure rotor under given fuel pressure $p_{fi}$, wherein i=1,2,3, . . . ,N;
    step 1.3: constructing a discrete small perturbation state space model of the aero-engine under the steady operating points according to the linear fitting method by taking the fuel pressure step signal $U_{pfi}$ as an input variable and taking the relative conversion speed response $Y_{nhi}$ of the high pressure rotor and the relative conversion speed response $Y_{nli}$ of the low pressure rotor as state variables;
    step 1.4: converting the discrete small perturbation state space model of the aero-engine under the steady operating points into a continuous small perturbation state space model according to a sampling period T to obtain the state space model of the aero-engine;

$$\begin{cases} \dot{x}_p = A_{pi}x_p + B_{pi}u \\ y_p = C_{pi}x_p + D_{pi}u \end{cases} \quad (1)$$

wherein the state variable is $x_p=[Y_{nl}^T\ Y_{nh}^T]^T\in R^n$; $\dot{x}_p$ represents a first derivative of $x_p$; an input variable is $u=U_p\in R^t$; an output variable is $y_p=Y_{nh}\in R^m$; $A_{pi}$, $B_{pi}$, $C_{pi}$ and $D_{pi}$ are system state space matrices; $C_{pi}=C_p=[0\ 1]$; $D_{pi}=D_p=0$; $R^n$, $R^t$ and $R^m$ respectively represent sets of real numbers with dimensions of n, t and m; T represents transposing for the matrices;

step 2: establishing an affine parameter-dependent linear-parameter-varying LPV model of the aero-engine;

step 2.1: setting the relative conversion speed $n_{hi}$ of the high pressure rotor of the aero-engine as a scheduling parameter $\theta(i)$, i=1,2,3, ... ,N;

step 2.2: expressing a system matrix $A_p(\theta)$ and a control matrix $B_p(\theta)$ of the continuous small perturbation state space model of the aero-engine as affine parameter-dependent forms, as follows:

$$A_p(\theta)=A_0+\theta A_1,\ B_p(\theta)=B_0+\theta B_1 \quad (2)$$

wherein $A_0$, $A_1$, $B_0$ and $B_1$ respectively represent coefficient matrices to be solved;

rewriting the formula (2) into $$A_p(\theta) = [I\ \theta I]\begin{bmatrix} A_0 \\ A_1 \end{bmatrix},\ B_p(\theta) = [I\ \theta I]\begin{bmatrix} B_0 \\ B_1 \end{bmatrix} \quad (3)$$

wherein I is a unit matrix;
then $$\begin{bmatrix} A_0 \\ A_1 \end{bmatrix} = [I\ \theta I]^+ A_p(\theta),\ \begin{bmatrix} B_0 \\ B_1 \end{bmatrix} = [I\ \theta I]^+ B_p(\theta) \quad (4)$$

wherein $[I\ \theta I]^+$ is Moore-Penrose pseudo-inverse of $[I\ \theta I]$, i.e., the system matrix $A_p(\theta)$ and the control matrix $B_p(\theta)$ of the solved affine parameter-dependent LPV model of the aero-engine;

step 2.3: establishing the affine parameter-dependent LPV model of the aero-engine $$\dot{x}_p = A_p(\theta)x_p + B_p(\theta)u$$

$$y_p = C_p x_p + D_p u \quad (5)$$

step 3: converting the affine parameter-dependent LPV model of the aero-engine with perturbation and sensor and actuator fault into a linear fractional transformation (LFT) structure, and establishing an $H_\infty$ synthesis framework of an LPV fault estimator of the aero-engine;

step 3.1: expressing the affine parameter-dependent LPV model $P(s,\theta)$ of the aero-engine having perturbation and sensor and actuator fault into $$\dot{x}_p = A_p(\theta)x_p + B_p(\theta)u + E_p d + F_p f$$

$$y_p = C_p x_p + D_p u + G_p d + H_p f \quad (6)$$

wherein $d\in R^q$ is a perturbation signal; $f\in R^l$ is a fault signal comprising sensor fault and actuator fault; $R^q$ and $R^l$ respectively represent sets of real numbers with dimensions of q and l; $E_p$, $F_p$, $G_p$ and $H_p$ are system state space matrices; an upper LFT structure of $P(s,\theta)$ is expressed into $$\begin{cases} \begin{bmatrix} \dot{x}_p \\ z_\theta \\ y_p \end{bmatrix} = \begin{bmatrix} A_p & B_{p\theta} & B_{pw} \\ C_{p\theta} & D_{p\theta\theta} & D_{p\theta w} \\ C_{pw} & D_{pw\theta} & D_{pww} \end{bmatrix}\begin{bmatrix} x_p \\ w_\theta \\ w \end{bmatrix},\ w = \begin{bmatrix} u \\ d \\ f \end{bmatrix} \\ w_\theta = \Delta(\theta)z_\theta \end{cases} \quad (7)$$

wherein an external input variable is $w=[u^T\ d^T\ f^T]^T\in R^{p1}$; $w_\theta\in R^r$ is an output variable of a time varying part $\Delta(\theta)=\theta I$; $z_\theta\in R^r$ is an input variable of the time varying part $\Delta(\theta)=\theta I$; $A_p$, $B_{p\theta}$, $B_{pw}$, $C_{p\theta}$, $C_{pw}$, $D_{p\theta\theta}$, $D_{p\theta w}$, $D_{pw\theta}$ and $D_{pww}$ are system state space matrices; $R^{p1}$ and $R^r$ respectively represent sets of real numbers with dimensions of p1 and r; p1=t+q+l, i.e., the dimension p1 of the external input variable w is equal to the sum of the dimension t of the input variable u of the aero-engine, the dimension q of the perturbation signal d and the dimension l of the fault signal f;

step 3.2: setting the form of the fault estimator $K(s,\theta)$ as follows $$\begin{cases} \dot{x}_K = A_K(\theta)x_K + B_K(\theta)u_K \\ \hat{f} = C_K(\theta)x_K + D_K(\theta)u_K \end{cases} \quad (8)$$

wherein $x_K\in R^k$ is a state variable of the fault estimator $K(s,\theta)$; $\dot{x}_K$ represents a first derivative of $x_K$; $R^k$ represents a set of real numbers with a dimension of k; $u_K=[u^T\ y_p^T]^T\in R^{p2}$ is an input variable of $K(s,\theta)$; p2=t+m, i.e., the dimension p2 of the input variable $u_K$ of $K(s,\theta)$ is equal to the sum of the dimension t of the input variable u of the aero-engine and the dimension m of the output variable $y_p$ of the aero-engine; $\hat{f}\in R^l$ is an output variable of $K(s,\theta)$, i.e., an estimated value of the fault signal f; $A_K(\theta)$, $B_K(\theta)$, $C_K(\theta)$ and $D_K(\theta)$ are system state space matrices; $K(s,\theta)$ is express into a lower LFT structure as follows:

$$\begin{cases} \begin{bmatrix} \dot{x}_K \\ \hat{f} \\ z_K \end{bmatrix} = \begin{bmatrix} A_K & B_{K1} & B_{K\theta} \\ C_{K1} & D_{K11} & D_{K1\theta} \\ C_{K\theta} & D_{K\theta 1} & D_{K\theta\theta} \end{bmatrix}\begin{bmatrix} x_K \\ u_K \\ w_K \end{bmatrix},\ u_K = \begin{bmatrix} u \\ y_p \end{bmatrix} \\ w_K = \Delta_K(\theta)z_K \end{cases} \quad (9)$$

wherein $w_K\in R^r$ is an output variable of the time varying part $\Delta_K(\theta)=\theta I$; $z_K\in R^r$ is an input variable of the time varying part $\Delta_K(\theta)=A_K$, $B_{K1}$, $B_{K\theta}$, $C_{K1}$, $C_{K\theta}$, $D_{K11}$, $D_{K1\theta}$, $D_{K\theta 1}$ and $D_{K\theta\theta}$ are system state space matrices;

step 3.3: according to the time varying part $\Delta(\theta)$ in the LPV model $P(s,\theta)$ of the aero-engine and the time varying part $\Delta_K(\theta)$ in the fault estimator $K(s,\theta)$, expressing the $H_\infty$ synthesis framework of the LPV fault estimator as:

$$\begin{bmatrix} \dot{x}_p \\ \dot{x}_K \\ z_K \\ z_\theta \\ e_f \end{bmatrix} = \begin{bmatrix} \overline{A} & \overline{B}_\theta & \overline{B}_w \\ \overline{C}_\theta & \overline{D}_{\theta\theta} & \overline{D}_{\theta w} \\ \overline{C}_w & \overline{D}_{w\theta} & \overline{D}_{ww} \end{bmatrix}\begin{bmatrix} x_p \\ x_K \\ w_K \\ w_\theta \\ w \end{bmatrix} \quad (10)$$

wherein $e_f = \hat{f} - f$ is a fault estimation error; system matrix $\overline{A} = A_0 + T_1 \Omega T_2$; system matrix $\overline{B}_\theta = B_{01} + T_1 \Omega T_3$; system matrix $\overline{B}_w = B_{02} + T_1 \Omega T_4$; system matrix $\overline{C}_\theta = C_{01} + T_5 \Omega T_2$; system matrix $\overline{D}_{\theta\theta} = D_{01} + T_5 \Omega T_3$; system matrix $\overline{D}_{\theta w} = D_{02} + T_5 \Omega T_4$; system matrix $\overline{C}_w = C_{02} + T_6 \Omega T_2$; system matrix $\overline{D}_{w\theta} = D_{03} + T_6 \Omega T_3$; system matrix $\overline{D}_{ww} = D_{04} + T_6 \Omega T_4$; fault estimator matrix $$\Omega = \begin{bmatrix} A_K & B_{K1} & B_{K\theta} \\ C_{K1} & D_{K11} & D_{K1\theta} \\ C_{K\theta} & D_{K\theta 1} & D_{K\theta\theta} \end{bmatrix};$$

matrix $$T_1 = \begin{bmatrix} 0 & B_2 & 0_{n \times r} \\ I_k & 0 & 0 \end{bmatrix};$$

matrix $$T_2 = \begin{bmatrix} 0 & I_k \\ C_2 & 0 \\ 0_{r \times n} & 0 \end{bmatrix};$$

matrix $$T_3 = \begin{bmatrix} 0_{k \times r} & 0 \\ 0 & D_{2\theta} \\ I_r & 0 \end{bmatrix};$$

matrix $$T_4 = \begin{bmatrix} 0_{k \times p1} \\ D_{21} \\ 0_{r \times p1} \end{bmatrix};$$

matrix $$T_5 = \begin{bmatrix} 0_{r \times k} & 0 & I_r \\ 0 & D_{\theta 2} & 0 \end{bmatrix};$$

matrix $T_6 = [0_{p1 \times k} \; D_{12} \; 0_{p1 \times r}]$; matrix $$A_0 = \begin{bmatrix} A & 0 \\ 0 & 0_k \end{bmatrix};$$

matrix $$B_{01} = \begin{bmatrix} 0 & B_\theta \\ 0_{k \times r} & 0 \end{bmatrix};$$

matrix $$B_{02} = \begin{bmatrix} B_1 \\ 0_{k \times p1} \end{bmatrix};$$

matrix $$C_{01} = \begin{bmatrix} 0 & 0_{r \times k} \\ C_\theta & 0 \end{bmatrix};$$

matrix $$D_{01} = \begin{bmatrix} 0_r & 0 \\ 0 & D_{\theta\theta} \end{bmatrix};$$

matrix $$D_{02} = \begin{bmatrix} 0_{r \times p1} \\ D_{\theta 1} \end{bmatrix};$$

matrix $C_{02} = [C_1 \; 0_{p1 \times k}]$; matrix $D_{03} = [0_{p1 \times r} \; D_{1\theta}]$; matrix $D_{04} = D_{11}$; matrix $A = A_p$; matrix $B_\theta = B_{p\theta}$; matrix $B_1 = B_{pw}$; matrix $B_2 = 0_{n \times l}$; matrix $C_\theta = C_{p\theta}$; matrix $D_{\theta\theta} = D_{p\theta\theta}$; matrix $D_{\theta 1} = D_{p\theta w}$; matrix $D_{\theta 2} = 0_{r \times l}$; matrix $C_1 = 0_{p1 \times n}$; matrix $D_{1\theta} = 0_{p1 \times r}$; matrix $$D_{11} = \begin{bmatrix} 0_{l \times (p1-l)} & -I_l \\ 0_{(p1-l) \times (p1-l)} & 0_{(p1-l) \times l} \end{bmatrix};$$

matrix $$D_{12} = \begin{bmatrix} I_l \\ 0_{(p1-l) \times l} \end{bmatrix};$$

matrix $$C_2 = \begin{bmatrix} 0_{r \times n} \\ C_{pw} \end{bmatrix};$$

matrix $$D_{2\theta} = \begin{bmatrix} 0_{r \times r} \\ C_{pw\theta} \end{bmatrix};$$

matrix $$D_{21} = \begin{bmatrix} I_t & 0_{t \times q} & 0_{t \times l} \\ & D_{pww} & \end{bmatrix};$$

$D_{22} = 0_{p2 \times l}$; n represents the dimension of the state variable $x_p$ of the aero-engine; r represents the dimension of the output variable $w_\theta$ of the time varying part $\Delta(\theta)$ and the output variable $w_K$ of the time varying part $\Delta_K(\theta)$; k represents the dimension of the state variable $x_K$ of the fault estimator $K(s,\theta)$;

step 4: solving a set of linear matrix inequalities (LMIs) to obtain the solution conditions of the fault estimator;

step 4.1: obtaining the solution conditions of the fault estimator $K(s,\theta)$, i.e., $$\begin{bmatrix} I & 0 & 0 \\ 0 & I & 0 \\ 0 & 0 & I \\ \overline{A} & \overline{B}_\theta & \overline{B}_w \\ \overline{C}_\theta & \overline{D}_{\theta\theta} & \overline{D}_{\theta w} \\ \overline{C}_w & \overline{D}_{w\theta} & \overline{D}_{ww} \end{bmatrix}^T \begin{bmatrix} 0 & 0 & 0 & X & 0 & 0 \\ 0 & Q & 0 & 0 & S & 0 \\ 0 & 0 & -\gamma I & 0 & 0 & 0 \\ X & 0 & 0 & 0 & 0 & 0 \\ 0 & S^T & 0 & 0 & R & 0 \\ 0 & 0 & 0 & 0 & 0 & \frac{1}{\gamma}I \end{bmatrix} \begin{bmatrix} I & 0 & 0 \\ 0 & I & 0 \\ 0 & 0 & I \\ \overline{A} & \overline{B}_\theta & \overline{B}_w \\ \overline{C}_\theta & \overline{D}_{\theta\theta} & \overline{D}_{\theta w} \\ \overline{C}_w & \overline{D}_{w\theta} & \overline{D}_{ww} \end{bmatrix} < 0 \quad (11)$$

$$\begin{bmatrix} \Delta(\theta) & 0 \\ 0 & \Delta_K(\theta) \\ I & 0 \\ 0 & I \end{bmatrix}^T P \begin{bmatrix} \Delta(\theta) & 0 \\ 0 & \Delta_K(\theta) \\ I & 0 \\ 0 & I \end{bmatrix} > 0 \quad (12)$$

wherein X is a symmetric positive-definite matrix; a full block scaling matrix $$P = \begin{bmatrix} Q & S \\ S^T & R \end{bmatrix}$$

is a symmetric matrix; $\gamma>0$ is a performance index; Q, S and R respectively represent sub-block matrices of P;

step 4.2: partitioning the symmetric positive-definite matrix X and an inverse matrix $X^{-1}$ thereof;

$$X = \begin{bmatrix} L & M \\ M^T & E \end{bmatrix}, X^{-1} = \begin{bmatrix} J & N \\ N^T & F \end{bmatrix} \quad (13)$$

wherein L, M and E respectively represent block matrices of X; J, N and F respectively represent sub-block matrices of $X^{-1}$;

partitioning the full block scaling matrix P and the inverse matrix $\tilde{P}$ thereof $$P = \begin{bmatrix} Q & S \\ S^T & R \end{bmatrix} = \begin{bmatrix} Q_1 & Q_2 & S_1 & S_2 \\ Q_2^T & Q_3 & S_3 & S_4 \\ \hline S_1^T & S_3^T & R_1 & R_2 \\ S_2^T & S_4^T & R_2^T & R_3 \end{bmatrix}, \quad (14)$$

$$\tilde{P} = \begin{bmatrix} \tilde{Q} & \tilde{S} \\ \tilde{S}^T & \tilde{R} \end{bmatrix} = \begin{bmatrix} \tilde{Q}_1 & \tilde{Q}_2 & \tilde{S}_1 & \tilde{S}_2 \\ \tilde{Q}_2^T & \tilde{Q}_3 & \tilde{S}_3 & \tilde{S}_4 \\ \hline \tilde{S}_1^T & \tilde{S}_3^T & \tilde{R}_1 & \tilde{R}_2 \\ \tilde{S}_2^T & \tilde{S}_4^T & \tilde{R}_2^T & \tilde{R}_3 \end{bmatrix}$$

wherein $Q_1$, $Q_2$ and $Q_3$ respectively represent sub-block matrices of Q; $S_1$, $S_2$, $S_3$ and $S_4$ respectively represent sub-block matrices of S; $R_1$, $R_2$ and $R_3$ respectively represent sub-block matrices of R; $\tilde{Q}$, $\tilde{S}$ and $\tilde{R}$ respectively represent sub-block matrices of $\tilde{P}$; $\tilde{Q}_1$, $\tilde{Q}_2$ and $\tilde{Q}_3$ respectively represent sub-block matrices of $\tilde{Q}$; $\tilde{S}_1$, $\tilde{S}_2$, $\tilde{S}_3$ and $\tilde{S}_4$ respectively represent sub-block matrices of $\tilde{S}$; $\tilde{R}_1$, $\tilde{R}_2$ and $\tilde{R}_3$ respectively represent sub-block matrices of $\tilde{R}$;

simplifying the solution conditions of the fault estimator $K(s,\theta)$, i.e., $$N_L^T \begin{bmatrix} I & 0 & 0 \\ 0 & I & 0 \\ 0 & 0 & I \\ A & B_\theta & B_1 \\ C_\theta & D_{\theta\theta} & D_{\theta 1} \\ C_1 & D_{1\theta} & D_{11} \end{bmatrix}^T \begin{bmatrix} 0 & 0 & 0 & L & 0 & 0 \\ 0 & Q_3 & 0 & 0 & S_4 & 0 \\ 0 & 0 & -\gamma I & 0 & 0 & 0 \\ L & 0 & 0 & 0 & 0 & 0 \\ 0 & S_4^T & 0 & 0 & R_3 & 0 \\ 0 & 0 & 0 & 0 & 0 & \frac{1}{\gamma}I \end{bmatrix} \begin{bmatrix} I & 0 & 0 \\ 0 & I & 0 \\ 0 & 0 & I \\ A & B_\theta & B_1 \\ C_\theta & D_{\theta\theta} & D_{\theta 1} \\ C_1 & D_{1\theta} & D_{11} \end{bmatrix} N_L < 0 \quad (15)$$

$$N_J^T \begin{bmatrix} -A^T & -C_\theta^T & -C_1^T \\ -B_\theta^T & -D_{\theta\theta}^T & -D_{1\theta}^T \\ -B_1^T & -D_{\theta 1}^T & -D_{11}^T \\ I & 0 & 0 \\ 0 & I & 0 \\ 0 & 0 & I \end{bmatrix}^T \begin{bmatrix} 0 & 0 & 0 & J & 0 & 0 \\ 0 & \tilde{Q}_3 & 0 & 0 & \tilde{S}_4 & 0 \\ 0 & 0 & -\frac{1}{\gamma}I & 0 & 0 & 0 \\ J & 0 & 0 & 0 & 0 & 0 \\ 0 & \tilde{S}_4^T & 0 & 0 & \tilde{R}_3 & 0 \\ 0 & 0 & 0 & 0 & 0 & \gamma I \end{bmatrix} \begin{bmatrix} -A^T & -C_\theta^T & -C_1^T \\ -B_\theta^T & -D_{\theta\theta}^T & -D_{1\theta}^T \\ -B_1^T & -D_{\theta 1}^T & -D_{11}^T \\ I & 0 & 0 \\ 0 & I & 0 \\ 0 & 0 & I \end{bmatrix} N_J > 0 \quad (16)$$

$$\begin{bmatrix} L & I \\ I & J \end{bmatrix} \quad (17)$$

$$R > 0, Q = -R, S + S^T = 0 \quad (18)$$

wherein $N_L$ and $N_J$ respectively represent the bases of the nuclear spaces of $[C_2\ D_{2\theta}\ D_{21}]$ and $[B_2^T\ D_{\theta 2}^T\ D_{12}^T]$;

step 4.3: solving the LMIs (15)-(18) to obtain matrix solutions L, J, $Q_3$, $\tilde{R}_3$, $S_4$ and $\tilde{S}_4$;

step 5: designing the fault estimator in combination with the LFT structure to realize fault diagnosis of the sensor and actuator of the aero-engine;

step 5.1: solving the symmetric positive-definite matrix X, the full block scaling matrix P and the inverse matrix $\tilde{P}$ thereof from the formulas (13) and (14) according to the solved matrix solutions L, J, $Q_3$, $\tilde{R}_3$, $S_4$ and $\tilde{S}_4$;

step 5.2: according to Schur complement Lemma, expressing the LMI (11) as $$\begin{bmatrix} \bar{A}^T X + X\bar{A} & X\bar{B}_\theta + \bar{C}^T_{z\theta}S^T & X\bar{B}_w & \bar{C}^T_\theta & \bar{C}^T_w \\ \bar{B}^T_\theta X + S\bar{C}_\theta & Q + \bar{D}^T_{\theta\theta}S^T + S\bar{D}_{\theta\theta} & S\bar{D}_{\theta w} & \bar{D}^T_{\theta\theta} & \bar{D}^T_{\theta w} \\ \bar{B}^T_w X & \bar{D}^T_{\theta w} S^T & -\gamma I & \bar{D}^T_{\theta w} & \bar{D}^T_{ww} \\ \bar{C}_\theta & \bar{D}_{\theta\theta} & \bar{D}_{\theta w} & -R & 0 \\ \bar{C}_w & \bar{D}_{w\theta} & \bar{D}_{ww} & 0 & -\gamma I \end{bmatrix} < 0 \qquad (19)$$

solving the LMI (19) to obtain a fault estimator matrix $\Omega$;

step 5.3: obtaining a state space matrix of the fault estimator $K(s,\theta)$ $$\begin{bmatrix} A_K(\theta) & B_K(\theta) \\ C_K(\theta) & D_K(\theta) \end{bmatrix} = \begin{bmatrix} A_K & B_{K1} \\ C_{K1} & D_{K11} \end{bmatrix} + \begin{bmatrix} B_{K\theta} \\ D_{K1\theta} \end{bmatrix} \Delta_K(\theta)(I - D_{K\theta\theta}\Delta_K(\theta))^{-1} [C_{K\theta} \quad D_{K\theta l}]. \qquad (20)$$

\* \* \* \* \*